United States Patent
Lee et al.

(10) Patent No.: US 7,112,122 B2
(45) Date of Patent: Sep. 26, 2006

(54) METHODS AND APPARATUS FOR REMOVING CONDUCTIVE MATERIAL FROM A MICROELECTRONIC SUBSTRATE

(75) Inventors: Whonchee Lee, Boise, ID (US); Scott E. Moore, Meridian, ID (US); Brian A. Vaartstra, Nampa, ID (US)

(73) Assignee: Micron Technology, Inc., Boise, ID (US)

( * ) Notice: Subject to any disclaimer, the term of this patent is extended or adjusted under 35 U.S.C. 154(b) by 25 days.

(21) Appl. No.: 10/665,219

(22) Filed: Sep. 17, 2003

(65) Prior Publication Data

US 2005/0059324 A1  Mar. 17, 2005

(51) Int. Cl.
*B24B 1/00* (2006.01)
(52) U.S. Cl. .......................................... 451/41; 451/60
(58) Field of Classification Search ................ 451/41, 451/60, 36, 54, 63, 286, 288, 289; 438/692, 438/693; 205/656, 671, 658, 659
See application file for complete search history.

(56) References Cited

U.S. PATENT DOCUMENTS

| | | |
|---|---|---|
| 2,315,695 A | 4/1943 | Faust |
| 2,516,105 A | 7/1950 | der Mateosian |
| 3,239,439 A | 3/1966 | Heimke |
| 3,334,210 A | 8/1967 | Williams et al. |
| 4,839,005 A | 6/1989 | Katsumoto et al. |
| 5,098,533 A | 3/1992 | Duke et al. |
| 5,162,248 A | 11/1992 | Dennison et al. |
| 5,244,534 A | 9/1993 | Yu et al. |
| 5,300,155 A | 4/1994 | Sandhu et al. |
| 5,344,539 A | 9/1994 | Shinogi et al. |
| 5,562,529 A | 10/1996 | Kishii et al. |
| 5,567,300 A | 10/1996 | Datta et al. |
| 5,575,885 A | 11/1996 | Hirabayashi et al. |
| 5,618,381 A | 4/1997 | Doan et al. |
| 5,624,300 A | 4/1997 | Kishii et al. |
| 5,676,587 A | 10/1997 | Landers et al. |
| 5,681,423 A | 10/1997 | Sandhu et al. |
| 5,780,358 A | 7/1998 | Zhou et al. |
| 5,807,165 A | 9/1998 | Uzoh et al. |
| 5,840,629 A | 11/1998 | Carpio |

(Continued)

FOREIGN PATENT DOCUMENTS

EP        0459397 A1    12/1991

(Continued)

OTHER PUBLICATIONS

U.S. Appl. No. 09/651,779, filed Aug. 30, 2000, Moore.

(Continued)

*Primary Examiner*—Dung Van Nguyen
(74) *Attorney, Agent, or Firm*—Perkins Coie LLP

(57) ABSTRACT

A method and apparatus for removing conductive material from a microelectronic substrate is disclosed. One method includes disposing an electrolytic liquid between a conductive material of a substrate and at least one electrode, with the electrolytic liquid having about 80% water or less. The substrate can be contacted with a polishing pad material, and the conductive material can be electrically coupled to a source of varying electrical signals via the electrolytic liquid and the electrode. The method can further include applying a varying electrical signal to the conductive material, moving at least one of the polishing pad material and the substrate relative to the other, and removing at least a portion of the conductive material while the electrolytic liquid is adjacent to the conductive material. By limiting/controlling the amount of water in the electrolytic liquid, an embodiment of the method can remove the conductive material with a reduced downforce.

56 Claims, 9 Drawing Sheets

U.S. PATENT DOCUMENTS

| | | | |
|---|---|---|---|
| 5,843,818 A | 12/1998 | Joo et al. | |
| 5,846,398 A | 12/1998 | Carpio | |
| 5,863,307 A | 1/1999 | Zhou et al. | |
| 5,888,866 A | 3/1999 | Chien | |
| 5,897,375 A | 4/1999 | Watts et al. | |
| 5,911,619 A | 6/1999 | Uzoh et al. | |
| 5,930,699 A | 7/1999 | Bhatia | |
| 5,934,980 A | 8/1999 | Koos et al. | |
| 5,952,687 A | 9/1999 | Kawakubo et al. | |
| 5,954,975 A | 9/1999 | Cadien et al. | |
| 5,954,997 A | 9/1999 | Kaufman et al. | |
| 5,972,792 A | 10/1999 | Hudson | |
| 5,993,637 A * | 11/1999 | Hisamatsu et al. | 205/652 |
| 6,001,730 A | 12/1999 | Farkas et al. | |
| 6,007,695 A | 12/1999 | Knall et al. | |
| 6,010,964 A | 1/2000 | Glass | |
| 6,024,856 A | 2/2000 | Haydu et al. | |
| 6,033,953 A | 3/2000 | Aoki et al. | |
| 6,039,633 A | 3/2000 | Chopra | |
| 6,046,099 A | 4/2000 | Cadien et al. | |
| 6,051,496 A | 4/2000 | Jang | |
| 6,060,386 A | 5/2000 | Givens | |
| 6,060,395 A | 5/2000 | Skrovan et al. | |
| 6,063,306 A | 5/2000 | Kaufman et al. | |
| 6,066,030 A | 5/2000 | Uzoh | |
| 6,066,559 A | 5/2000 | Gonzalez et al. | |
| 6,068,787 A | 5/2000 | Grumbine et al. | |
| 6,083,840 A | 7/2000 | Mravic et al. | |
| 6,100,197 A | 8/2000 | Hasegawa | |
| 6,103,096 A | 8/2000 | Datta et al. | |
| 6,103,628 A | 8/2000 | Talieh | |
| 6,103,636 A | 8/2000 | Zahorik | |
| 6,115,233 A | 9/2000 | Seliskar et al. | |
| 6,117,781 A | 9/2000 | Lukanc et al. | |
| 6,121,152 A | 9/2000 | Adams et al. | |
| 6,132,586 A | 10/2000 | Adams et al. | |
| 6,143,155 A | 11/2000 | Adams et al. | |
| 6,162,681 A | 12/2000 | Wu | |
| 6,171,467 B1 | 1/2001 | Weihs et al. | |
| 6,174,425 B1 | 1/2001 | Simpson et al. | |
| 6,176,992 B1 | 1/2001 | Talieh | |
| 6,180,947 B1 | 1/2001 | Stickel et al. | |
| 6,187,651 B1 | 2/2001 | Oh | |
| 6,190,494 B1 | 2/2001 | Dow | |
| 6,196,899 B1 | 3/2001 | Chopra et al. | |
| 6,197,182 B1 | 3/2001 | Kaufman et al. | |
| 6,218,309 B1 | 4/2001 | Miller et al. | |
| 6,250,994 B1 | 6/2001 | Chopra et al. | |
| 6,259,128 B1 | 7/2001 | Adler et al. | |
| 6,273,786 B1 | 8/2001 | Chopra et al. | |
| 6,276,996 B1 | 8/2001 | Chopra | |
| 6,280,581 B1 | 8/2001 | Cheng | |
| 6,287,974 B1 | 9/2001 | Miller | |
| 6,299,741 B1 | 10/2001 | Sun et al. | |
| 6,303,956 B1 | 10/2001 | Sandhu et al. | |
| 6,313,038 B1 | 11/2001 | Chopra et al. | |
| 6,322,422 B1 | 11/2001 | Satou | |
| 6,328,632 B1 | 12/2001 | Chopra | |
| 6,368,184 B1 | 4/2002 | Beckage | |
| 6,368,190 B1 * | 4/2002 | Easter et al. | 451/41 |
| 6,379,223 B1 | 4/2002 | Sun et al. | |
| 6,395,607 B1 | 5/2002 | Chung | |
| 6,416,647 B1 | 7/2002 | Dordi et al. | |
| 6,455,370 B1 | 9/2002 | Lane | |
| 6,461,911 B1 | 10/2002 | Ahn et al. | |
| 6,464,855 B1 | 10/2002 | Chadda et al. | |
| 6,504,247 B1 | 1/2003 | Chung | |
| 6,620,037 B1 | 9/2003 | Kaufman et al. | |
| 6,689,258 B2 | 2/2004 | Lansford et al. | |
| 6,693,036 B1 | 2/2004 | Nogami et al. | |
| 6,722,942 B1 | 4/2004 | Lansford et al. | |
| 6,722,950 B1 * | 4/2004 | Dabral et al. | 451/36 |
| 6,736,952 B1 | 5/2004 | Emesh et al. | |
| 6,753,250 B1 | 6/2004 | Hill et al. | |
| 6,776,693 B1 | 8/2004 | Duboust et al. | |
| 6,780,772 B1 | 8/2004 | Uzoh et al. | |
| 6,797,623 B1 * | 9/2004 | Sato et al. | 438/691 |
| 6,846,227 B1 * | 1/2005 | Sato et al. | 451/288 |
| 6,881,664 B1 | 4/2005 | Catabay et al. | |
| 2001/0025976 A1 | 10/2001 | Lee | |
| 2001/0036746 A1 | 11/2001 | Sato et al. | |
| 2002/0025759 A1 | 2/2002 | Lee et al. | |
| 2002/0025760 A1 | 2/2002 | Lee et al. | |
| 2002/0025763 A1 | 2/2002 | Lee et al. | |
| 2002/0052126 A1 | 5/2002 | Lee et al. | |
| 2002/0070126 A1 | 6/2002 | Sato et al. | |
| 2002/0104764 A1 | 8/2002 | Banerjee et al. | |
| 2002/0108861 A1 * | 8/2002 | Emesh et al. | 205/81 |
| 2002/0115283 A1 | 8/2002 | Ho et al. | |
| 2003/0054729 A1 | 3/2003 | Lee et al. | |
| 2003/0064669 A1 | 4/2003 | Basol et al. | |
| 2003/0109198 A1 | 6/2003 | Lee et al. | |
| 2003/0129927 A1 | 7/2003 | Lee et al. | |
| 2003/0178320 A1 * | 9/2003 | Liu et al. | 205/640 |
| 2003/0226764 A1 | 12/2003 | Moore et al. | |
| 2004/0192052 A1 | 9/2004 | Mukherjee et al. | |

FOREIGN PATENT DOCUMENTS

| | | |
|---|---|---|
| EP | 1 123 956 A1 | 8/2001 |
| JP | 1-241129 A | 9/1989 |
| JP | 2001077117 A2 | 3/2001 |
| JP | 2001077117 A3 | 3/2001 |
| WO | WO 00/26443 A2 | 5/2000 |
| WO | WO 00/26443 A3 | 5/2000 |
| WO | WO 00/28586 A2 | 5/2000 |
| WO | WO 00/28586 A3 | 5/2000 |
| WO | WO 00/32356 A1 | 6/2000 |
| WO | WO 00/59008 A2 | 10/2000 |
| WO | WO 00/59008 A3 | 10/2000 |
| WO | WO 00/59682 A1 | 10/2000 |
| WO | WO 02/064314 A1 | 8/2002 |

OTHER PUBLICATIONS

U.S. Appl. No. 09/651,808, filed Aug. 30, 2000, Chopra et al.
U.S. Appl. No. 09/653,392, filed Aug. 31, 2000, Chopra et al.
U.S. Appl. No. 09/653,411, filed Aug. 31, 2000, Lee et al.
U.S. Appl. No. 10/230,463, filed Aug. 29, 2002, Lee et al.
U.S. Appl. No. 10/230,602, filed Aug. 29, 2002, Chopra.
U.S. Appl. No. 10/230,628, filed Aug. 29, 2002, Lee et al.
Aboaf, J.A. and R.W. Broadie, IBM Technical Disclosure Bulletin, Rounding of Square-Shape Holes in Silicon Wafers, vol. 19, No. 8, p. 3042, Jan. 1977, XP-002235690, NN 77013042.
ATMI, Inc., adapted from a presentation at the Semicon West '99 Low Dielectric Materials Technology Conference, San Francisco, California, Jul. 12, 1999, pp. 13-25.
Bassous, E., IBM Technical Disclosure Bulletin, Low Temperature Methods for Rounding Silicon Nozles, vol. 20, No. 2, Jul. 1977, pp. 810-811, XP-002235692, NN 7707810.
Bernhardt, A.F., Contolini, R.J., Mayer, S.T, "Electrochemical Planarization for Multi-Level Metallization of Microcircuitry," *CircuiTree Journal*, vol. 8, No. 10, pp. 38, 40, 42, 44, 46, and 48, Oct. 1995.
D'Heurle, F.M. and K.C. Park, IBM Technical Disclosure Bulletin, Electrolytic Process for Metal Pattern Generation, vol. 17, No. 1, pp. 271-272, Jun. 1974, XP-002235691, NN 7406271.
Frankenthal, R.P. and Eaton, D.H., "Electroetching of Platinum in the Titanium-Platinum-Gold Metallization on Silicon Integrated Circuits", *Journal of The Electrochemical Society*, vol. 123, No. 5, pp. 703-706, May 1976.
Huang, C.S. et al., "A Novel UV Baking Process to Improve DUV Photoresist Hardness," pp. 135-138, Proceedings of the 1999 International Symposium on VLSI Technology, Systems, and Applications: Proceedings of Technical Papers: Jun. 8-10, 1999, Taipei, Taiwan, Institute of Electrical and Electronics Engineers, Inc., Sep. 1999.

Juchniewicz, R. et al. "Influence of Pulsed Current of Platinised Titanium and Tantalum Anode Durability," International Congress on Metallic Corrosion, Proceedings—vol. 3, pp. 449-453, Toronto, Jun. 3-7, 1984.

Kondo, S. et al., "Abrasive-Free Polishing for Copper Damascene Interconnection," *Journal of the Electrochemical Society*, vol. 147, No. 10, pp. 3907-3913, The Electrochemical Society, Inc., Pennington, New Jersey, 2000.

McGraw-Hill, *Concise Encyclopedia of Science & Technology*, Sybil P. Parker, Editor in Chief, Fourth Edition, p. 367, McGraw-Hill, New York, 1998.

Micro Photonics, Inc., "CSM Nano Hardness Tester," 6 pages, retrieved from the Internet on Jul. 29, 2002, <http://www.microphotonics.com/nbt.html>.

Micro Photonics, Inc., CSM Application Bulletin, "Low-load Micro Scratch Tester (MST) for characterisation of thin polymer films," 3 pages, retrieved from the Internet on Jul. 25, 2002, <http://www.microphotonics.com/mstABpoly.html>.

PhysicsWorld, "Hard Materials", excerpt of "Superhard Superlattices," 1 page, Jan. 1998, S. Barnett and A. Madan, retrieved from the Internet on Jul. 29, 2002, <http://physicsweb.org/box/world/11/1/11/world-11-1-11-1>.

\* cited by examiner

US 7,112,122 B2

METHODS AND APPARATUS FOR REMOVING CONDUCTIVE MATERIAL FROM A MICROELECTRONIC SUBSTRATE

CROSS-REFERENCE TO RELATED APPLICATIONS

The present application relates to the following pending U.S. Patent Applications, all of which are incorporated herein in their entireties by reference: Ser. No. 09/651,779, filed Aug. 30, 2000; Ser. No. 09/888,084, filed Jun. 21, 2001; Ser. No. 09/887,767, filed Jun. 21, 2001; Ser. No. 09/888, 002, filed Jun. 21, 2001, Ser. No. 10/230,970, filed Aug. 29, 2002; Ser. No. 10/230,972, filed Aug. 29, 2002; Ser. No. 10/230,973, filed Aug. 29, 2002; 10/230,628, filed Aug. 29, 2002; and Ser. No. 10/230,602.

TECHNICAL FIELD

This invention relates to methods and apparatuses for removing conductive material from microelectronic substrates.

BACKGROUND

Microelectronic substrates and substrate assemblies typically include a semiconductor material having features, such as memory cells, that are linked with conductive lines. The conductive lines can be formed by first forming trenches or other recesses in the semiconductor material, and then overlaying a conductive material (such as a metal) in the trenches. The conductive material is then selectively removed to leave conductive lines extending from one feature in the semiconductor material to another.

Electrolytic techniques have been used to both deposit and remove metallic layers from semiconductor substrates. For example, an alternating current can be applied to a conductive layer via an intermediate electrolyte to remove portions of the layer. In one arrangement, shown in FIG. 1, a conventional apparatus 60 includes a first electrode 20a and a second electrode 20b coupled to a current source 21. The first electrode 20a is attached directly to a metallic layer 11 of a semiconductor substrate 10 and the second electrode 20b is at least partially immersed in a liquid electrolyte 31 disposed on the surface of the metallic layer 11 by moving the second electrode downwardly until it contacts the electrolyte 31. A barrier 22 protects the first electrode 20a from direct contact with the electrolyte 31. The current source 21 applies alternating current to the substrate 10 via the electrodes 20a and 20b and the electrolyte 31 to remove conductive material from the conductive layer 11. The alternating current signal can have a variety of wave forms, such as those disclosed by Frankenthal et al. in a publication entitled, "Electroetching of Platinum in the Titanium-Platinum-Gold Metallization on Silicon Integrated Circuits" (Bell Laboratories), incorporated herein in its entirety by reference.

One drawback with the arrangement shown in FIG. 1 is that it may not be possible to remove material from the conductive layer 11 in the region where the first electrode 20a is attached because the barrier 22 prevents the electrolyte 31 from contacting the substrate 10 in this region. Alternatively, if the first electrode 20a contacts the electrolyte in this region, the electrolytic process can degrade the first electrode 20a. Still a further drawback is that the electrolytic process may not uniformly remove material from the substrate 10. For example, "islands" of residual conductive material having no direct electrical connection to the first electrode 20a may develop in the conductive layer 11. The residual conductive material can interfere with the formation and/or operation of the conductive lines, and it may be difficult or impossible to remove with the electrolytic process unless the first electrode 20a is repositioned to be coupled to such "islands."

One approach to addressing some of the foregoing drawbacks is to attach a plurality of first electrodes 20a around the periphery of the substrate 10 to increase the uniformity with which the conductive material is removed. However, islands of conductive material may still remain despite the additional first electrodes 20a. Another approach is to form the electrodes 20a and 20b from an inert material, such as carbon, and remove the barrier 22 to increase the area of the conductive layer 11 in contact with the electrolyte 31. However, such inert electrodes may not be as effective as more reactive electrodes at removing the conductive material, and the inert electrodes may still leave residual conductive material on the substrate 10.

FIG. 2 shows still another approach to addressing some of the foregoing drawbacks in which two substrates 10 are partially immersed in a vessel 30 containing the electrolyte 31. The first electrode 20a is attached to one substrate 10 and the second electrode 20b is attached to the other substrate 10. An advantage of this approach is that the electrodes 20a and 20b do not contact the electrolyte. However, islands of conductive material may still remain after the electrolytic process is complete, and it may be difficult to remove conductive material from the points at which the electrodes 20a and 20b are attached to the substrates 10.

Another drawback with existing electrolytic methods is that they may not be suitable for removing certain conductive materials, including tantalum and tantalum compounds, from microelectronic substrates 10 at a high enough rate, or with the desired uniformity, while avoiding damage to the microelectronic substrate. Accordingly, existing electrolytic methods may not be suitable for processing microelectronic substrates at production-level speeds.

SUMMARY

The present invention is directed toward methods and apparatuses for removing conductive materials from microelectronic substrates. A method in accordance with one aspect of the invention includes disposing an electrolytic liquid between an electrically conductive material of a microelectronic substrate and at least one electrode, with the electrolytic liquid having about 80% water or less. The microelectronic substrate is contacted with a polishing pad material and the conductive material of the microelectronic substrate is electrically coupled to a source of varying electrical signals via the electrolytic liquid and the at least one electrode. The method can further include applying a varying electrical signal to the conductive material, moving at least one of the polishing pad material and the microelectronic substrate relative to the other, and removing at least a portion of the conductive material from the microelectronic substrate while the electrolytic liquid is adjacent to the electrically conductive material.

In further aspects of the invention, the conductive material of the microelectronic substrate can include tantalum or a tantalum compound and the method for removing the conductive material can include moving at least one of the substrate and the at least one electrode relative to the other, without necessarily contacting the substrate with a polishing pad material. The method can further include complexing the tantalum as a metal-organic species in solution. The electrolytic liquid can include 1% water or less and the downforce applied to the microelectronic substrate can be about 1.0 psi or less. The method can further include at least restricting the amount of water in the electrolytic liquid.

An apparatus in accordance with an aspect of the invention includes an electrolytic liquid volume coupleable to a supply of electrolytic liquid, and a carrier positioned to releasably carry a microelectronic substrate in fluid communication with the electrolytic liquid volume. An enclosure can be disposed around the electrolytic liquid volume and the carrier, and can be configured to at least restrict the passage of water from a region external to the enclosure to a region internal to the enclosure. In further aspects of the invention, the enclosure can be coupled to a source of non-aqueous purge gas, and/or can include a support member configured to carry a polishing pad in contact with the microelectronic substrate.

DETAILED DESCRIPTION

The present disclosure describes methods and apparatuses for removing conductive materials from a microelectronic substrate and/or substrate assembly used in the fabrication of microelectronic devices. Many specific details of certain embodiments of the invention are set forth in the following description and in FIGS. 3–12B to provide a thorough understanding of these embodiments. One skilled in the art, however, will understand that the present invention may have additional embodiments, or that the invention may be practiced without several of the details described below.

Figure 3:
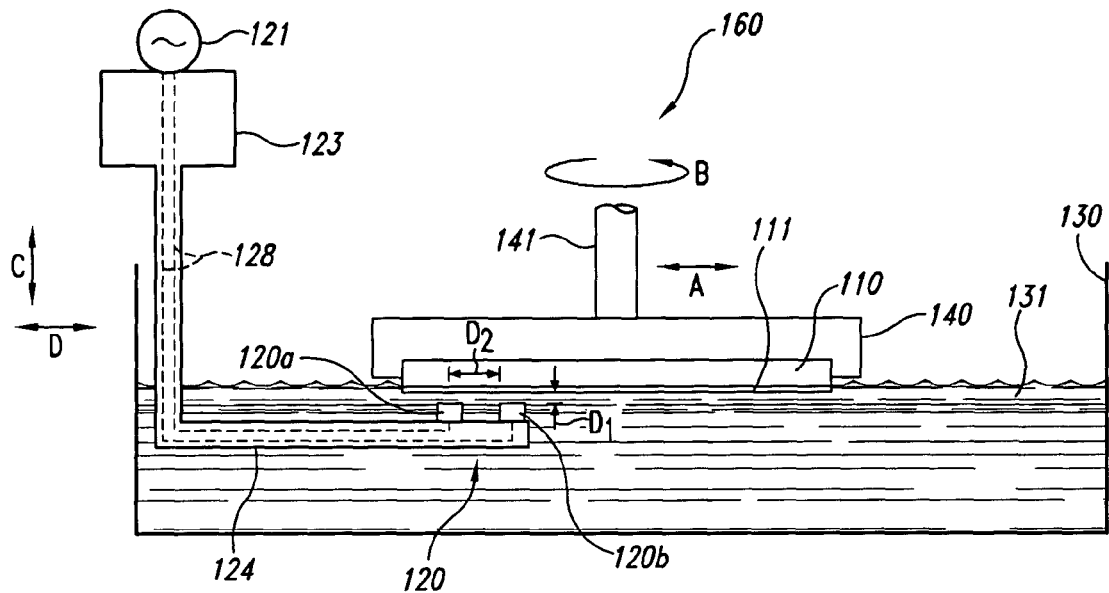
FIG. 3 is a partially schematic, side elevational view of an apparatus having a support member and a pair of electrodes for removing conductive material from a microelectronic substrate in accordance with an embodiment of the invention.

FIG. 3 is a partially schematic, side elevational view of an apparatus 160 for removing conductive material from a microelectronic substrate or substrate assembly 110 in accordance with an embodiment of the invention. In one aspect of this embodiment, the apparatus 160 includes a vessel 130 containing an electrolyte 131, which can be in a liquid or a gel state. A support member 140 supports the microelectronic substrate 110 relative to the vessel 130 so that a conductive layer 111 of the substrate 110 contacts the electrolyte 131. The conductive layer 111 can include metals such as platinum, tungsten, tantalum, gold, copper, or other conductive materials. In another aspect of this embodiment, the support member 140 is coupled to a substrate drive unit 141 that moves the support member 140 and the substrate 110 relative to the vessel 130. For example, the substrate drive unit 141 can translate the support member 140 (as indicated by arrow "A") and/or rotate the support member 140 (as indicated by arrow "B").

The apparatus 160 can further include a first electrode 120a and a second electrode 120b (referred to collectively as electrodes 120) supported relative to the microelectronic substrate 110 by a support member 124. In one aspect of this embodiment, the support arm 124 is coupled to an electrode drive unit 123 for moving the electrodes 120 relative to the microelectronic substrate 110. For example, the electrode drive unit 123 can move the electrodes toward and away from the conductive layer 111 of the microelectronic substrate 110, (as indicated by arrow "C"), and/or transversely (as indicated by arrow "D") in a plane generally parallel to the conductive layer 111. Alternatively, the electrode drive unit 123 can move the electrodes in other fashions, or the electrode drive unit 123 can be eliminated when the substrate drive unit 141 provides sufficient relative motion between the substrate 110 and the electrodes 120.

In either embodiment described above with reference to FIG. 3, the electrodes 120 are coupled to a current source 121 with leads 128 for supplying electrical current to the electrolyte 131 and the conductive layer 111. In operation, the current source 121 supplies an alternating current (single phase or multiphase) to the electrodes 120. The current passes through the electrolyte 131 and reacts electrochemically with the conductive layer 111 to remove material (for example, atoms or groups of atoms) from the conductive layer 111. The electrodes 120 and/or the substrate 110 can be moved relative to each other to remove material from selected portions of the conductive layer 111, or from the entire conductive layer 111.

In one aspect of an embodiment of the apparatus 160 shown in FIG. 3, a distance $D_1$ between the electrodes 120 and the conductive layer 111 is set to be smaller than a distance $D_2$ between the first electrode 120a and the second electrode 120b. Furthermore, the electrolyte 131 generally has a higher resistance than the conductive layer 111. Accordingly, the alternating current follows the path of least resistance from the first electrode 120a, through the electrolyte 131 to the conductive layer 111 and back through the electrolyte 131 to the second electrode 120b, rather than from the first electrode 120a directly through the electrolyte 131 to the second electrode 120b. Alternatively, a low dielectric material (not shown) can be positioned between the first electrode 120a and the second electrode 120b to decouple direct electrical communication between the electrodes 120 that does not first pass through the conductive layer 111.

Figure 1:
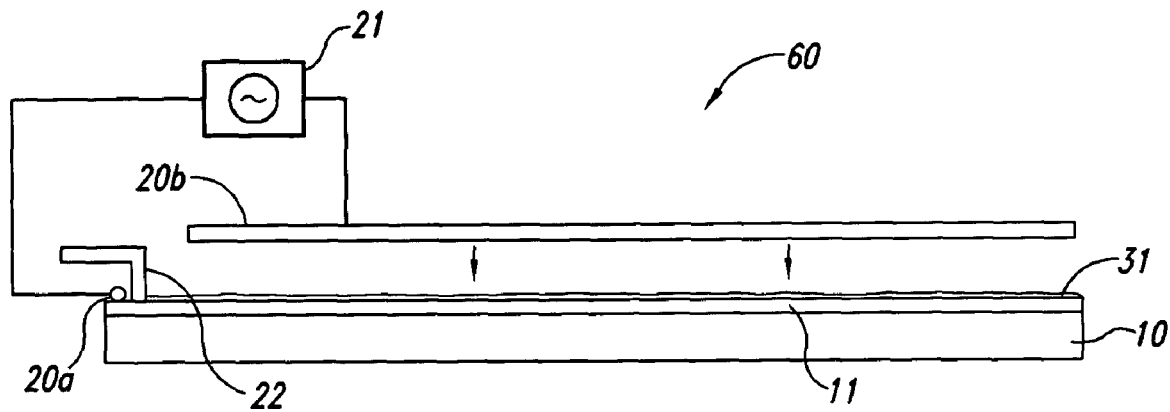
FIG. 1 is a partially schematic, side elevational view of an apparatus for removing conductive material from a semiconductor substrate in accordance with the prior art.
Figure 2:
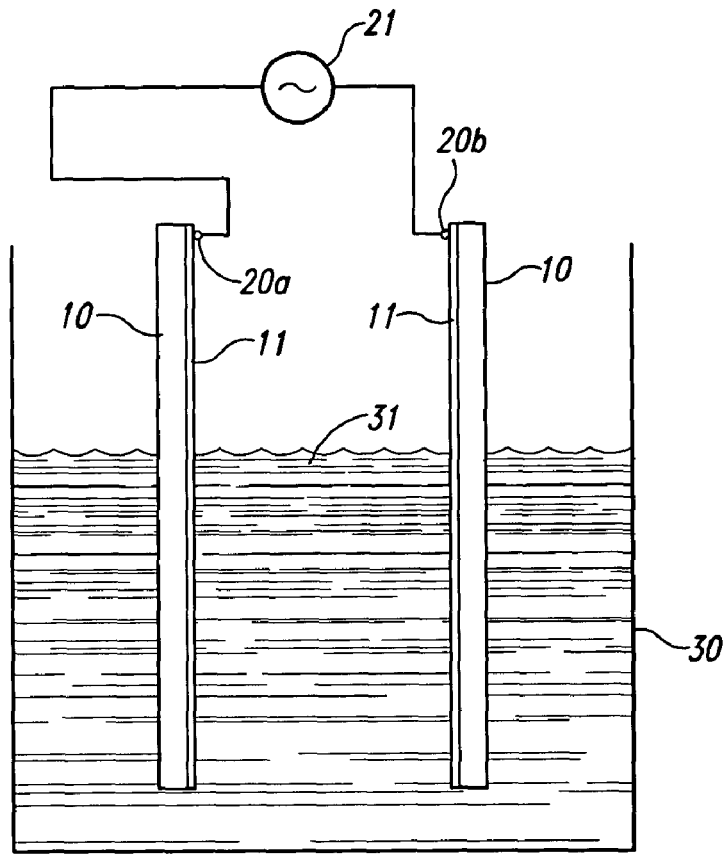
FIG. 2 is a partially schematic side, elevational view of another apparatus for removing conductive material from two semiconductor substrates in accordance with the prior art.

One feature of an embodiment of the apparatus 160 shown in FIG. 3 is that the electrodes 120 do not contact the conductive layer 111 of the substrate 110. An advantage of this arrangement is that it can eliminate the residual conductive material resulting from a direct electrical connection between the electrodes 120 and the conductive layer 111, described above with reference to FIGS. 1 and 2. For example, the apparatus 160 can eliminate residual conductive material adjacent to the contact region between the electrodes and the conductive layer because the electrodes 120 do not contact the conductive layer 111.

Another feature of an embodiment of the apparatus 160 described above with reference to FIG. 3 is that the substrate 110 and/or the electrodes 120 can move relative to the other to position the electrodes 120 at any point adjacent to the conductive layer 111. An advantage of this arrangement is that the electrodes 120 can be sequentially positioned adjacent to every portion of the conductive layer to remove material from the entire conductive layer 111. Alternatively, when it is desired to remove only selected portions of the conductive layer 111, the electrodes 120 can be moved to those selected portions, leaving the remaining portions of the conductive layer 111 intact.

Figure 4:
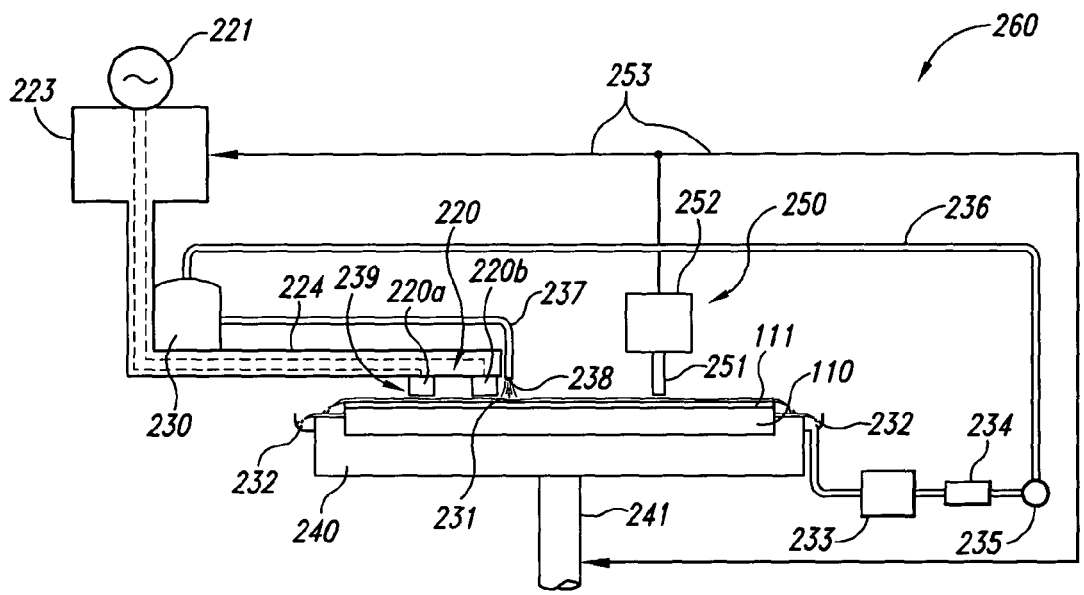
FIG. 4 is a partially schematic, side elevational view of an apparatus for removing conductive material and sensing characteristics of the microelectronic substrate from which the material is removed in accordance with another embodiment of the invention.

FIG. 4 is a partially schematic, side elevational view of an apparatus 260 that includes a support member 240 positioned to support the substrate 110 in accordance with another embodiment of the invention. In one aspect of this embodiment, the support member 240 supports the substrate 110 with the conductive layer 111 facing upwardly. A substrate drive unit 241 can move the support member 240 and the substrate 110, as described above with reference to FIG. 3. First and second electrodes 220a and 220b are positioned above the conductive layer 111 and are coupled to a current source 221. A support member 224 supports the electrodes 220 relative to the substrate 110 and is coupled to an electrode drive unit 223 to move the electrodes 220 over the surface of the support conductive layer 111 in a manner generally similar to that described above with reference to FIG. 3.

In one aspect of the embodiment shown in FIG. 4, the apparatus 260 further includes an electrolyte vessel 230 having a supply conduit 237 with an aperture 238 positioned proximate to the electrodes 220. Accordingly, an electrolyte 231 can be deposited locally in an interface region 239 between the electrodes 220 and the conductive layer 111, without necessarily covering the entire conductive layer 111. The electrolyte 231 and the conductive material removed from the conductive layer 111 flow over the substrate 110 and collect in an electrolyte receptacle 232. The mixture of electrolyte 231 and conductive material can flow to a reclaimer 233 that removes most of the conductive material from the electrolyte 231. A filter 234 positioned downstream of the reclaimer 233 provides additional filtration of the electrolyte 231 and a pump 235 returns the reconditioned electrolyte 231 to the electrolyte vessel 230 via a return line 236.

In another aspect of the embodiment shown in FIG. 4, the apparatus 260 can include a sensor assembly 250 having a sensor 251 positioned proximate to the conductive layer 111, and a sensor control unit 252 coupled to the sensor 251 for processing signals generated by the sensor 251. The control unit 252 can also move the sensor 251 relative to the substrate 110. In a further aspect of this embodiment, the sensor assembly 250 can be coupled via a feedback path 253 to the electrode drive unit 223 and/or the substrate drive unit 241. Accordingly, the sensor 251 can determine which areas of the conductive layer 111 require additional material removal and can move the electrodes 220 and/or the substrate 110 relative to each other to position the electrodes 220 over those areas. Alternatively, (for example, when the removal process is highly repeatable), the electrodes 220 and/or the substrate 110 can move relative to each other according to a pre-determined motion schedule.

The sensor 251 and the sensor control unit 252 can have any of a number of suitable configurations. For example, in one embodiment, the sensor 251 can be an optical sensor that detects removal of the conductive layer 111 by detecting a change in the intensity, wavelength or phase shift of the light reflected from the substrate 110 when the conductive material is removed. Alternatively, the sensor 251 can emit and detect reflections of radiation having other wavelengths, for example, x-ray radiation. In still another embodiment, the sensor 251 can measure a change in resistance or capacitance of the conductive layer 111 between two selected points. In a further aspect of this embodiment, one or both of the electrodes 220 can perform the function of the sensor 251 (as well as the material removal function described above), eliminating the need for a separate sensor 251. In still further embodiments, the sensor 251 can detect a change in the voltage and/or current drawn from the current supply 221 as the conductive layer 111 is removed.

In any of the embodiments described above with reference to FIG. 4, the sensor 251 can be positioned apart from the electrolyte 231 because the electrolyte 231 is concentrated in the interface region 239 between the electrodes 220 and the conductive layer 111. Accordingly, the accuracy with which the sensor 251 determines the progress of the electrolytic process can be improved because the electrolyte 231 will be less likely to interfere with the operation of the sensor 251. For example, when the sensor 251 is an optical sensor, the electrolyte 231 will be less likely to distort the radiation reflected from the surface of the substrate 110 because the sensor 251 is positioned away from the interface region 239.

Another feature of an embodiment of the apparatus 260 described above with reference to FIG. 4 is that the electrolyte 231 supplied to the interface region 239 is continually replenished, either with a reconditioned electrolyte or a fresh electrolyte. An advantage of this feature is that the electrochemical reaction between the electrodes 220 and the conductive layer 111 can be maintained at a high and consistent level.

Figure 5:
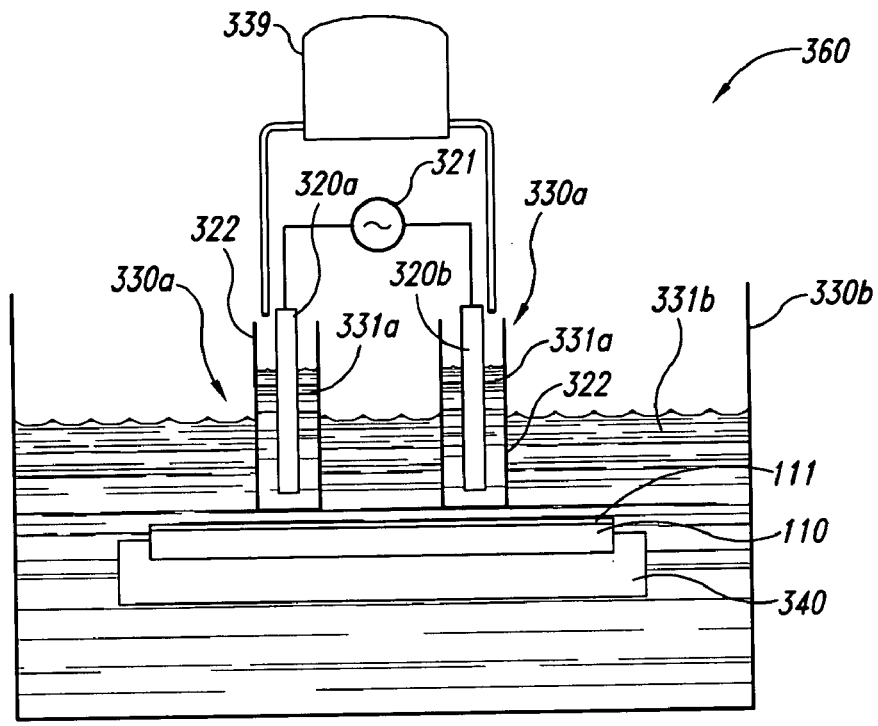
FIG. 5 is a partially schematic, side elevational view of an apparatus that includes two electrolytes in accordance with still another embodiment of the invention.

FIG. 5 is a partially schematic, side elevational view of an apparatus 360 that directs alternating current to the substrate 110 through a first electrolyte 331a and a second electrolyte 331b. In one aspect of this embodiment, the first electrolyte 331a is disposed in two first electrolyte vessels 330a, and the second electrolyte 331b is disposed in a second electrolyte vessel 330b. The first electrolyte vessels 330a are partially submerged in the second electrolyte 331b. The apparatus 360 can further include electrodes 320, shown as a first electrode 320a and a second electrode 320b, each coupled to a current supply 321 and each housed in one of the first electrolyte vessels 330a. Alternatively, one of the electrodes 320 can be coupled to ground. The electrodes 320 can include materials such as silver, platinum, copper and/or other materials, and the first electrolyte 331a can include sodium chloride, potassium chloride, copper sulfate and/or other electrolytes that are compatible with the material forming the electrodes 320.

In one aspect of this embodiment, the first electrolyte vessels 330a include a flow restrictor 322, such as a permeable isolation membrane formed from Teflon™, sintered materials such as sintered glass, quartz or sapphire, or other suitable porous materials that allow ions to pass back and forth between the first electrolyte vessels 330a and the second electrolyte vessel 330b, but do not allow the second electrolyte 330b to pass inwardly toward the electrodes 320 (for example, in a manner generally similar to a salt bridge). Alternatively, the first electrolyte 331a can be supplied to the electrode vessels 330a from a first electrolyte source 339 at a pressure and rate sufficient to direct the first electrolyte 331a outwardly through the flow restrictor 322 without allowing the first electrolyte 331a or the second electrolyte 330b to return through the flow restrictor 322. In either embodiment, the second electrolyte 331b remains electrically coupled to the electrodes 320 by the flow of the first electrolyte 331a through the restrictor 322.

In one aspect of this embodiment, the apparatus 360 can also include a support member 340 that supports the substrate 110 with the conductive layer 111 facing toward the electrodes 320. For example, the support member 340 can be positioned in the second electrolyte vessel 330b. In a further aspect of this embodiment, the support member 340 and/or the electrodes 320 can be movable relative to each other by one or more drive units (not shown).

One feature of an embodiment of the apparatus 360 described above as reference to FIG. 5 is that the first electrolyte 331a can be selected to be compatible with the electrodes 320. An advantage of this feature is that the first electrolyte 331a can be less likely than conventional electrolytes to degrade the electrodes 320. Conversely, the second electrolyte 331b can be selected without regard to the effect it has on the electrodes 320 because it is chemically isolated from the electrodes 320 by the flow restrictor 322. Accordingly, the second electrolyte 331b can include hydrochloric acid or another agent that reacts aggressively with the conductive layer 111 of the substrate 110.

Figure 6:
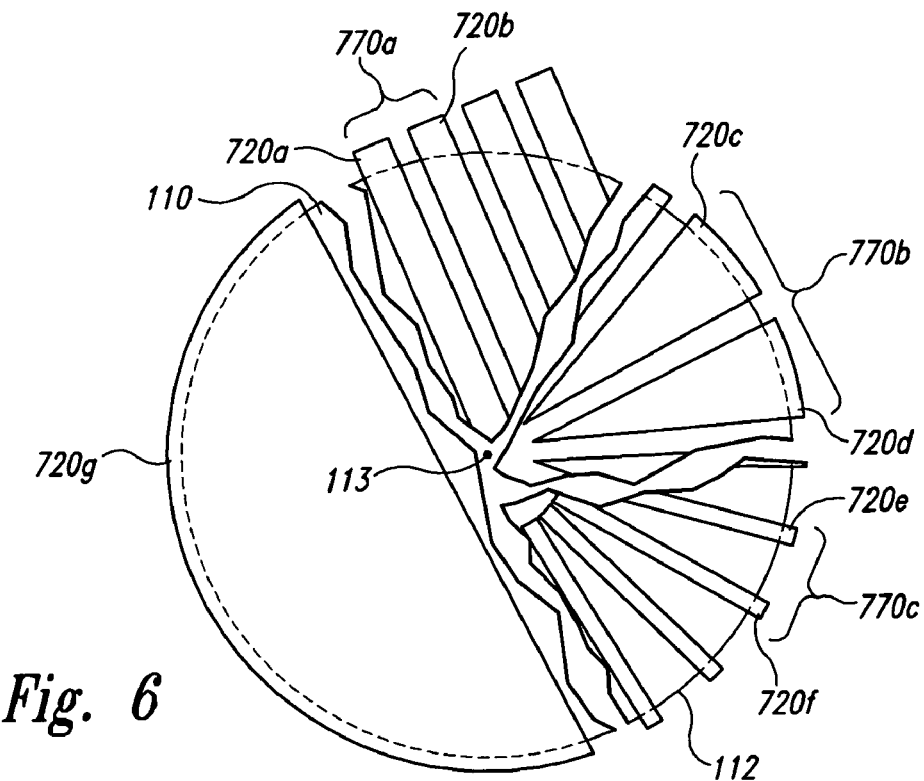
FIG. 6 is a partially schematic, plan view of a substrate adjacent to a plurality of electrodes in accordance with still further embodiments of the invention.

FIG. 6 is a top plan view of the microelectronic substrate 110 positioned beneath a plurality of electrodes having shapes and configurations in accordance with several embodiments of the invention. For purposes of illustration, several different types of electrodes are shown positioned proximate to the same microelectronic substrate 110; however, in practice, electrodes of the same type can be positioned relative to a single microelectronic substrate 110.

In one embodiment, electrodes 720a and 720b can be grouped to form an electrode pair 770a, with each electrode 720a and 720b coupled to an opposite terminal of a current supply 121 (FIG. 3). The electrodes 770a and 770b can have an elongated or strip-type shape and can be arranged to extend parallel to each other over the diameter of the substrate 110. The spacing between adjacent electrodes of an electrode pair 370a can be selected to direct the electrical current into the substrate 110, as described above with reference to FIG. 3.

In an alternate embodiment, electrodes 720c and 720d can be grouped to form an electrode pair 770b, and each electrode 720c and 720d can have a wedge or "pie" shape that tapers inwardly toward the center of the microelectronic substrate 110. In still another embodiment, narrow, strip-type electrodes 720e and 720f can be grouped to form electrode pairs 770c, with each electrode 720e and 720f extending radially outwardly from the center 113 of the microelectronic substrate 110 toward the periphery 112 of the microelectronic substrate 110.

In still another embodiment, a single electrode 720g can extend over approximately half the area of the microelectronic substrate 110 and can have a semicircular planform shape. The electrode 720g can be grouped with another electrode (not shown) having a shape corresponding to a mirror image of the electrode 720g, and both electrodes can be coupled to the current source 121 to provide alternating current to the microelectronic substrate in any of the manners described above with reference to FIGS. 3–5.

Figure 7:
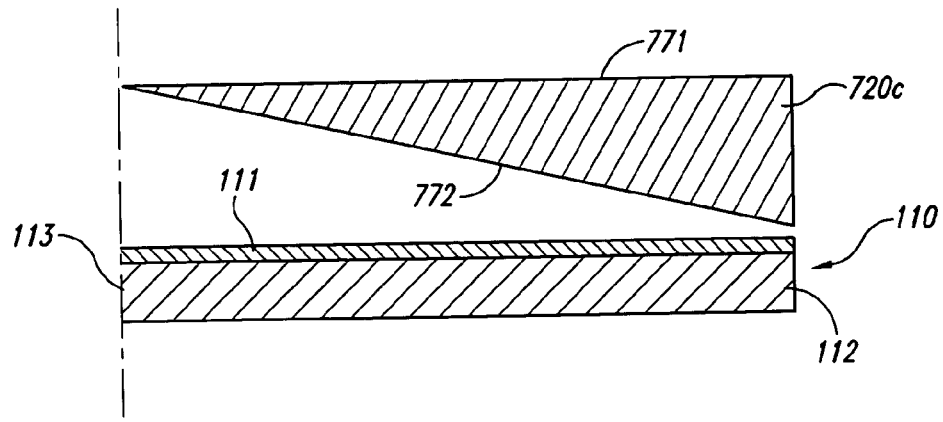
FIG. 7 is a cross-sectional, side elevational view of an electrode and a substrate in accordance with yet another embodiment of the invention.

FIG. 7 is a partially schematic, cross-sectional side elevational view of a portion of the substrate 110 positioned beneath the electrode 720c described above with reference to FIG. 6. In one aspect of this embodiment, the electrode 720c has an upper surface 771 and a lower surface 772 opposite the upper surface 771 and facing the conductive layer 111 of the substrate 110. The lower surface 772 can taper downwardly from the center 113 of the substrate 110 toward the perimeter 112 of the substrate 110 in one aspect of this embodiment to give the electrode 720c a wedge-shaped profile. Alternatively, the electrode 720c can have a plate-type configuration with the lower surface 772 positioned as shown in FIG. 7 and the upper surface 771 parallel to the lower surface 772. One feature of either embodiment is that the electrical coupling between the electrode 720c and the substrate 110 can be stronger toward the periphery 112 of the substrate 110 than toward the center 113 of the substrate 110. This feature can be advantageous when the periphery 112 of the substrate 110 moves relative to the electrode 720c at a faster rate than does the center 113 of the substrate 110, for example, when the substrate 110 rotates about its center 113. Accordingly, the electrode 720c can be shaped to account for relative motion between the electrode and the substrate 110.

In other embodiments, the electrode 720c can have other shapes. For example, the lower surface 772 can have a curved rather than a flat profile. Alternatively, any of the electrodes described above with reference to FIG. 6 (or other electrodes having shapes other than those shown in FIG. 6) can have a sloped or curved lower surface. In still further embodiments, the electrodes can have other shapes that account for relative motion between the electrodes and the substrate 110.

Figure 8A:
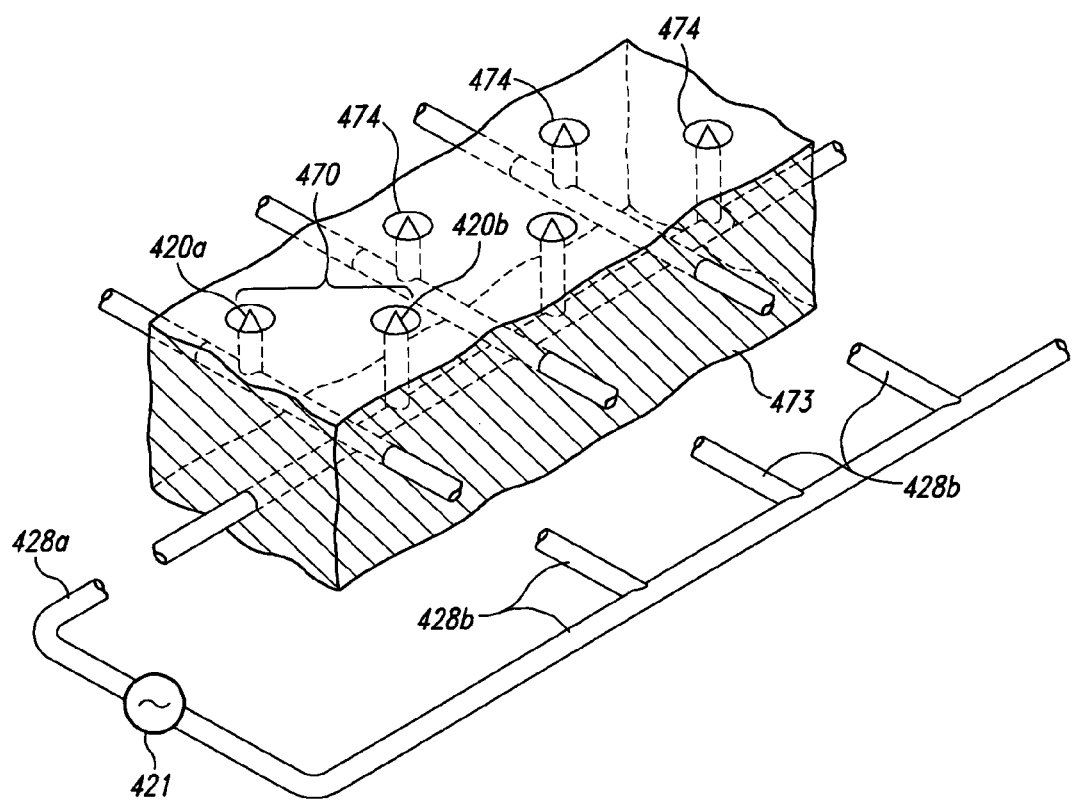
FIG. 8A is a partially schematic, isometric view of a portion of a support for housing electrode pairs in accordance with still another embodiment of the invention.

FIG. 8A is a partially schematic view of an electrode support 473 for supporting a plurality of electrodes in accordance with another embodiment of the invention. In one aspect of this embodiment, the electrode support 473 can include a plurality of electrode apertures 474, each of which houses either a first electrode 420a or a second electrode 420b. The first electrodes 420a are coupled through the apertures 474 to a first lead 428a and the second electrodes 420b are coupled to a second lead 428b. Both of the leads 428a and 428b are coupled to a current supply 421. Accordingly, each pair 470 of first and second electrodes 420a and 420b defines part of a circuit that is completed by the substrate 110 and the electrolyte(s) described above with reference to FIGS. 3–5.

In one aspect of this embodiment, the first lead 428*a* can be offset from the second lead 428*b* to reduce the likelihood for short circuits and/or capacitive coupling between the leads. In a further aspect of this embodiment, the electrode support 473 can have a configuration generally similar to any of those described above with reference to FIGS. 1–7. For example, any of the individual electrodes (e.g., 320*a*, 320*c*, 320*e*, or 320*g*) described above with reference to FIG. 6 can be replaced with an electrode support 473 having the same overall shape and including a plurality of apertures 474, each of which houses one of the first electrodes 420*a* or the second electrodes 420*b*.

In still a further aspect of this embodiment, the electrode pairs 470 shown in FIG. 8A can be arranged in a manner that corresponds to the proximity between the electrodes 420*a*, 420*b* and the microelectronic substrate 110 (FIG. 7), and/or the electrode pairs 470 can be arranged to correspond to the rate of relative motion between the electrodes 420*a*, 420*b* and the microelectronic substrate 110. For example, the electrode pairs 470 can be more heavily concentrated in the periphery 112 of the substrate 110 or other regions where the relative velocity between the electrode pairs 470 and the substrate 110 is relatively high (see FIG. 7). Accordingly, the increased concentration of electrode pairs 470 can provide an increased electrolytic current to compensate for the high relative velocity. Furthermore, the first electrode 420*a* and the second electrode 420*b* of each electrode pair 470 can be relatively close together in regions (such as the periphery 112 of the substrate 110) where the electrodes are close to the conductive layer 111 (see FIG. 7) because the close proximity to the conductive layer 111 reduces the likelihood for direct electrical coupling between the first electrode 420*a* and the second electrode 420*b*. In still a further aspect of this embodiment, the amplitude, frequency and/or waveform shape supplied to different electrode pairs 470 can vary depending on factors such as the spacing between the electrode pair 470 and the microelectronic substrate 110, and the relative velocity between the electrode pair 470 and the microelectronic substrate 110.

Figure 8B:
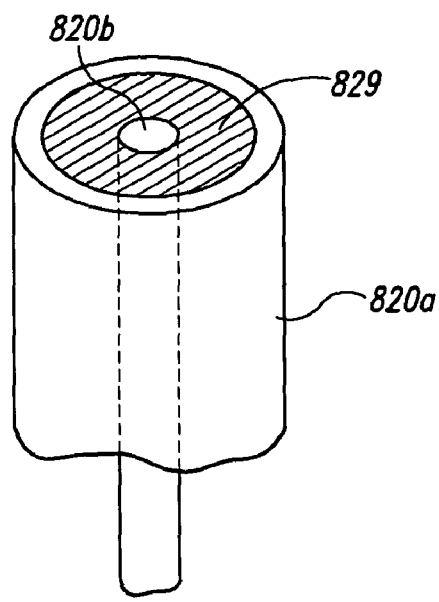
FIGS. 8B–8C are isometric views of electrodes in accordance with still further embodiments of the invention.
Figure 8C:
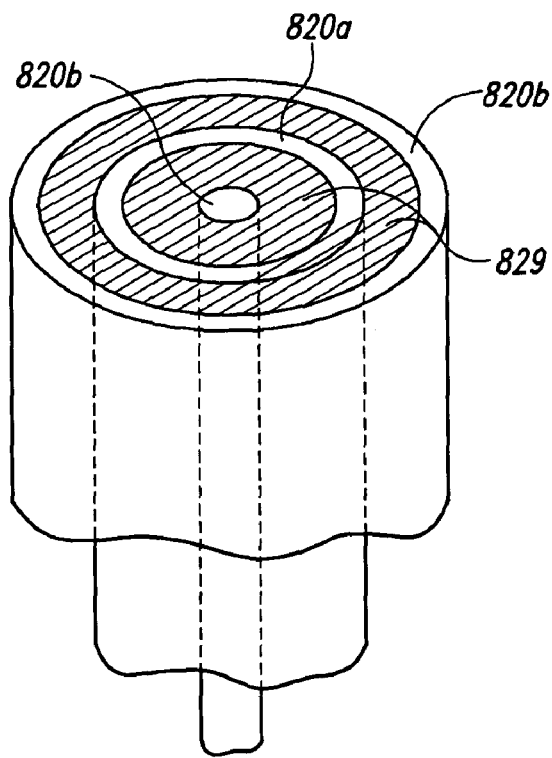

FIGS. 8B–8C illustrate electrodes 820 (shown as first electrodes 820*a* and second electrodes 820*b*) arranged concentrically in accordance with still further embodiments of the invention. In one embodiment shown in FIG. 8B, the first electrode 820*a* can be positioned concentrically around the second electrode 820*b*, and a dielectric material 829 can be disposed between the first electrode 820*a* and the second electrode 820*b*. The first electrode 820*a* can define a complete 360° arc around the second electrode 820*b*, as shown in FIG. 8B, or alternatively, the first electrode 820*a* can define an arc of less than 360°.

In another embodiment, shown in FIG. 8C, the first electrode 820A can be concentrically disposed between two second electrodes 820*b*, with the dielectric material 829 disposed between neighboring electrodes 820. In one aspect of this embodiment, current can be supplied to each of the second electrodes 820*b* with no phase shifting. Alternatively, the current supplied to one second electrode 820*b* can be phase-shifted relative to the current supplied to the other second electrode 820*b*. In a further aspect of the embodiment, the current supplied to each second electrode 820*b* can differ in characteristics other than phase, for example, amplitude.

One feature of the electrodes 820 described above with respect to FIGS. 8B–8C is that the first electrode 820*a* can shield the second electrode(s) 820*b* from interference from other current sources. For example, the first electrode 820*a* can be coupled to ground to shield the second electrodes 820*b*. An advantage of this arrangement is that the current applied to the substrate 110 (FIG. 7) via the electrodes 820 can be more accurately controlled.

Figure 9:
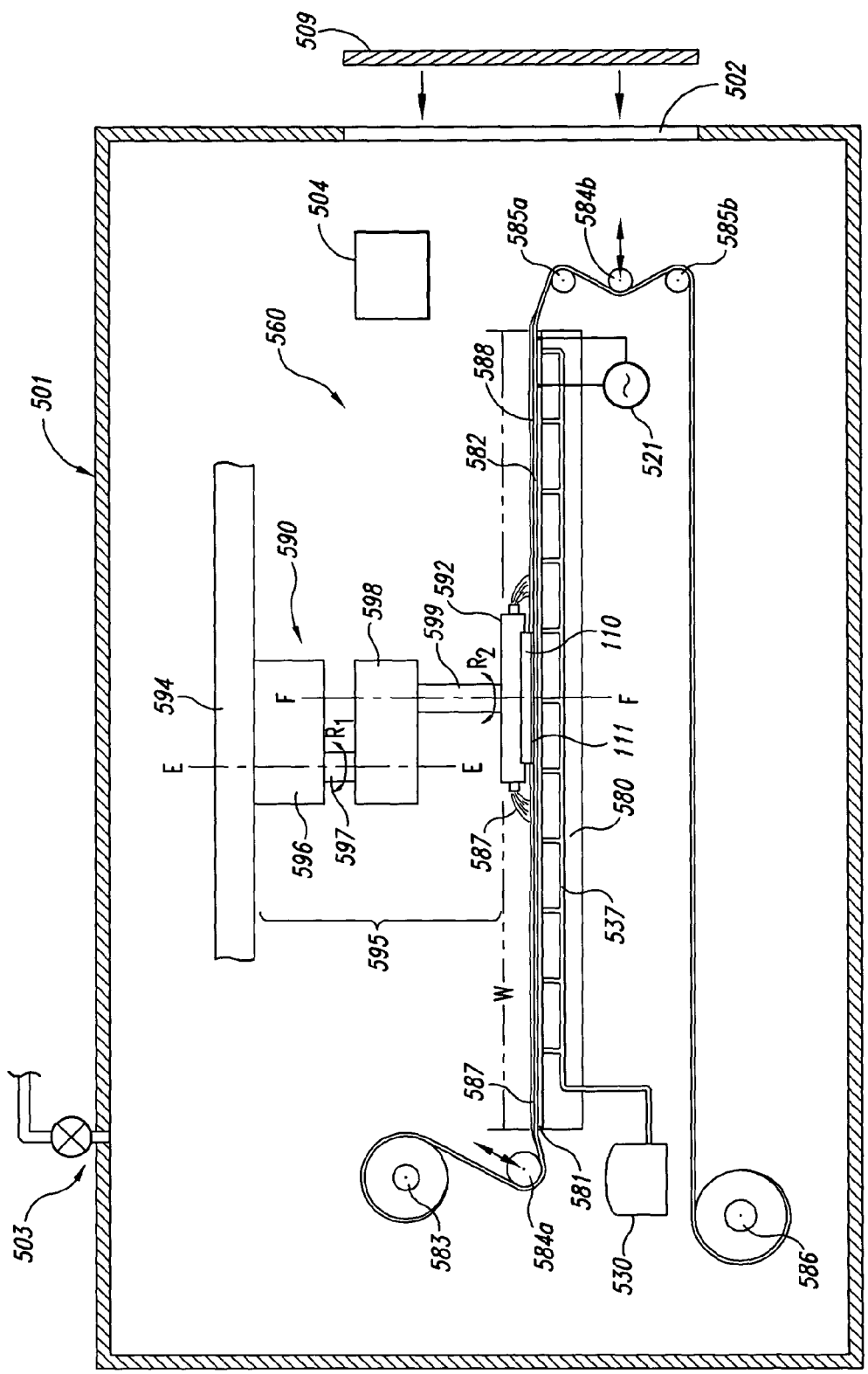
FIG. 9 is a partially schematic, side elevational view of an apparatus for both planarizing and electrolytically processing microelectronic substrates in accordance with yet another embodiment of the invention.

FIG. 9 schematically illustrates an apparatus 560 for both planarizing and electrolytically processing the microelectronic substrate 110 in accordance with an embodiment of the invention. In one aspect of this embodiment, the apparatus 560 has a support table 580 with a top-panel 581 at a workstation where an operative portion "W" of a planarizing or polishing pad 582 is positioned. The top-panel 581 is generally a rigid plate to provide a flat, solid surface to which a particular section of the planarizing pad 582 may be secured during planarization.

The apparatus 560 can also have a plurality of rollers to guide, position and hold the planarizing pad 582 over the top-panel 581. The rollers can include a supply roller 583, first and second idler rollers 584*a* and 584*b*, first and second guide rollers 585*a* and 585*b*, and a take-up roller 586. The supply roller 583 carries an unused or pre-operative portion of the planarizing pad 582, and the take-up roller 583 carries a used or post-operative portion of the planarizing pad 582. Additionally, the first idler roller 584*a* and the first guide roller 585*a* can stretch the planarizing pad 582 over the top-panel 581 to hold the planarizing pad 582 stationary during operation. A motor (not shown) drives at least one of the supply roller 583 and the take-up roller 586 to sequentially advance the planarizing pad 582 across the top-panel 581. Accordingly, clean pre-operative sections of the planarizing pad 582 may be quickly substituted for used sections to provide a consistent surface for planarizing and/or cleaning the substrate 110.

The apparatus 560 can also have a carrier assembly 590 that controls and protects the substrate 110 during planarization. The carrier assembly 590 can include a substrate holder 592 to pick up, hold and release the substrate 110 at appropriate stages of the planarizing process. The carrier assembly 590 can also have a support gantry 594 carrying a drive assembly 595 that can translate along the gantry 594. The drive assembly 595 can have an actuator 596, a drive shaft 597 coupled to the actuator 596, and an arm 598 projecting from the drive shaft 597. The arm 598 carries the substrate holder 592 via a terminal shaft 599 such that the drive assembly 595 orbits the substrate holder 592 about an axis E—E (as indicated by arrow "$R_1$"). The terminal shaft 599 may also rotate the substrate holder 592 about its central axis F—F (as indicated by arrow "$R_2$").

The planarizing pad 582 and a planarizing solution 587 define a planarizing medium that mechanically and/or chemically-mechanically removes material from the surface of the substrate 110. The planarizing pad 582 used in the apparatus 560 can be a fixed-abrasive planarizing pad in which abrasive particles are fixedly bonded to a suspension medium. Accordingly, the planarizing solution 587 can be a "clean solution" without abrasive particles because the abrasive particles are fixedly distributed across a planarizing or polishing surface 588 of the planarizing pad 582. In other applications, the planarizing pad 582 may be a non-abrasive pad without abrasive particles, and the planarizing solution 587 can be a slurry with abrasive particles and chemicals to remove material from the substrate 110.

To planarize the substrate 110 with the apparatus 560, the carrier assembly 590 presses the substrate 110 against the planarizing surface 588 of the planarizing pad 582 in the presence of the planarizing solution 587. The drive assembly 595 then orbits the substrate holder 592 about the axis E—E and optionally rotates the substrate holder 592 about the axis F—F to translate the substrate 110 across the planarizing surface 588. As a result, the abrasive particles and/or the chemicals in the planarizing medium remove material from the surface of the substrate 110 in a chemical and/or chemical-mechanical planarization (CMP) process. Accordingly, the planarizing pad 582 can smooth the substrate 110 by removing rough features projecting from the conductive layer 111 of the substrate 110.

In a further aspect of this embodiment, the apparatus 560 can include an electrolyte supply vessel 530 that delivers an electrolyte to the planarizing surface of the planarizing pad 582 with a conduit 537, as described in greater detail with reference to FIG. 10. The apparatus 560 can further include a current supply 521 coupled to the support table 580 and/or the top-panel 581 to supply an electrical current to electrodes positioned in the support table 580 and/or the top-panel 581. Accordingly, the apparatus 560 can electrolytically remove material from the conductive layer 111 in a manner similar to that described above with reference to FIGS. 1–8C.

In one aspect of an embodiment of the apparatus 560 described above with reference to FIG. 9, material can be sequentially removed from the conductive layer 111 of the substrate 110 first by an electrolytic process and then by a CMP process. For example, the electrolytic process can remove material from the conductive layer 111 in a manner that roughens the conductive layer 111. After a selected period of electrolytic processing time has elapsed, the electrolytic processing operation can be halted and additional material can be removed via CMP processing. Alternatively, the electrolytic process and the CMP process can be conducted simultaneously. In either of these processing arrangements, one feature of an embodiment of the apparatus 560 described above with reference to FIG. 9 is that the same apparatus 560 can planarize the substrate 110 via CMP and remove material from the substrate 110 via an electrolytic process. An advantage of this arrangement is that the substrate 110 need not be moved from one apparatus to another to undergo both CMP and electrolytic processing.

Another advantage of an embodiment of the apparatus 560 described above with reference to FIG. 9 is that the processes, when used in conjunction with each other, is expected to remove material from the substrate 110 more quickly and accurately than some conventional processes. For example, as described above, the electrolytic process can remove relatively large amounts of material in a manner that roughens the microelectronic substrate 110, and the planarizing process can remove material on a finer scale in a manner that smoothes and/or flattens the microelectronic substrate 110.

In particular embodiments, the amount of water in the electrolytic liquid (e.g., the composite mixture of the planarizing liquid 587 and the electrolyte provided by the electrolyte supply vessel 530) can be less than that of existing electrolytic liquids used for polishing and/or planarizing the microelectronic substrates 110. As described in greater detail below, a feature of these embodiments is that such a liquid can permit an operator to reduce the normal force (e.g., the downforce) applied at the interface between the microelectronic substrate 110 and the planarizing pad 582. An advantage of this arrangement is that the likelihood for breaking the microelectronic substrate 110 during processing can be reduced, the uniformity with which material is removed from the microelectronic substrate 110 can be increased, and/or the likelihood for smearing materials at the surface of the microelectronic substrate 110 can be reduced. In a particular embodiment, tantalum can be removed from the microelectronic substrate 110 at a significantly reduced downforce. For example, the downforce can be reduced from a conventional value of about 2 psi to a value of from about 0.1 psi to about 1 psi. In the limit, the downforce can be reduced to zero and the electrolytic liquid can be disposed in an apparatus generally similar to any of those described above with reference to FIGS. 3–5. Electrolytic liquids having compositions suitable for this and other embodiments are described in greater detail below.

In one embodiment, the electrolytic liquid can include a pure or nearly pure organic solvent and a dissolved salt, with an overall water content of about 1% (by volume) or less. Electrolytic liquids having water contents in this range can be less likely to passivate the conductive material of the microelectronic substrate 110. In a particular embodiment, the electrolytic liquid can include methanol and ammonium chloride. In a particular aspect of this embodiment, an electrolytic liquid having this composition can be used to electrochemically and/or electrochemically-mechanically remove tantalum and/or tantalum nitride from the microelectronic substrate 110, with a significantly reduced downforce. For example, in a further particular aspect of this embodiment, the polishing pad 582 can be eliminated and the tantalum or tantalum compound can be removed electrochemically without contact with a polishing pad. It is believed that one possible reason for the reduced down force is that the tantalum and/or tantalum nitride typically oxidizes to form a tantalum pentoxide film, which is very stable in an aqueous system. However, in an organic solvent system the tantalum pentoxide may be less stable due to the formation of tantalum-methoxide complexes (e.g., Ta—(O—CH$_3$)$_x$) or other metal-organic species in solution. The complexing interaction may occur directly with the tantalum and/or with the tantalum pentoxide film and may be thermodynamically more likely to occur in the presence of a pure or nearly pure organic solvent than in the presence of an aqueous system.

In one embodiment (as described above) the electrolytic liquid can include about 1% water or less. In other embodiments, the electrolytic liquid can include greater amounts of water while still allowing a reduction in the downforce applied between the microelectronic substrate 110 and the planarizing pad 582. For example, in one embodiment, the electrolytic liquid can include less than about 10% water. In other embodiments, the electrolytic liquid can include less than about 50% water or less than about 80% water. The particular amount of water (if any) selected for the electrolytic liquid can depend upon the desired reduction in downforce and/or the composition of the material to be removed from the microelectronic substrate 110.

In one embodiment (as described above) the electrolytic liquid can include an alcohol as the solvent. In other embodiments, the electrolytic liquid can include other non-aqueous polar solvents, or mixtures of organic solvents (with some polar and some not), with the overall mixture being at least partially polar. Examples of other non-aqueous polar solvents include but are not limited to organic amines (including triethylamine and/or analine), organic acids (including beta diketone and/or 2,5-pentanedione), carboxylic acids (including acetic acid and/or formic acid), nitrites (including acetonitrile), and isonitriles (including methylisonitrile). Other substances, all of which are polar to some degree, include aromatic hydrocarbons (e.g., xylene), organic phosphates (e.g., triethylphosphate), halocarbons (e.g., bromoethane) and alkoxides and/or oxo alkoxides.

In a further aspect of an embodiment described above with reference to FIG. 9, the apparatus 560 can include one or more features configured to restrict the amount of water absorbed by or otherwise mixed with the electrolytic liquid during processing. For example, in one aspect of this embodiment, the apparatus 560 can include an at least partially (and in one embodiment, completely) water-tight enclosure 501 that surrounds the electrolytic liquid on the planarizing pad 582. In one aspect of this embodiment, the enclosure 501 can include a clean room. In other embodiments, the enclosure 501 can be smaller to control an environment around only a portion of the apparatus 560. In either embodiment, the enclosure 501 can include a sealable access portion 502 (shown open in FIG. 9) to allow ingress and egress of the microelectronic substrates 110 and/or personnel required to operate the apparatus 560. A door or other sealable device 509 can be removably positioned in the access portion 502. In one aspect of this embodiment, the region within the enclosure 501 can be filled with a purge gas provided through a purge gas port 503. The purge gas can include an inert gas (e.g., nitrogen) that can displace any water vapor within the enclosure 501 without having an effect on the chemical, electrical, and/or mechanical interaction with the microelectronic substrate 110. In another embodiment, the purge gas port 503 can be coupled to a vacuum source to evacuate the environment within the enclosure 501. In either embodiment, a desiccant 504 (which can include calcium sulfate, molecular sieves, or other hydrophilic substances) can be positioned within the enclosure 501 to remove any residual water vapor within the enclosure 501. Accordingly, the amount of water (if any) in the electrolytic liquid can be controlled to preserve the associated benefits described above. In another embodiment, the desiccant can be disposed directly in the electrolytic liquid. For example, the desiccant can have abrasive properties and can accordingly aid in polishing the microelectronic substrate 110. After absorbing water, the desiccant can be filtered from the electrolyte, dehydrated and recycled. In still another embodiment, the electrolyte can be stored near the desiccant, then provided to the planarizing pad 582 for processing, and then removed for dehydrating and recycling.

Figure 10:
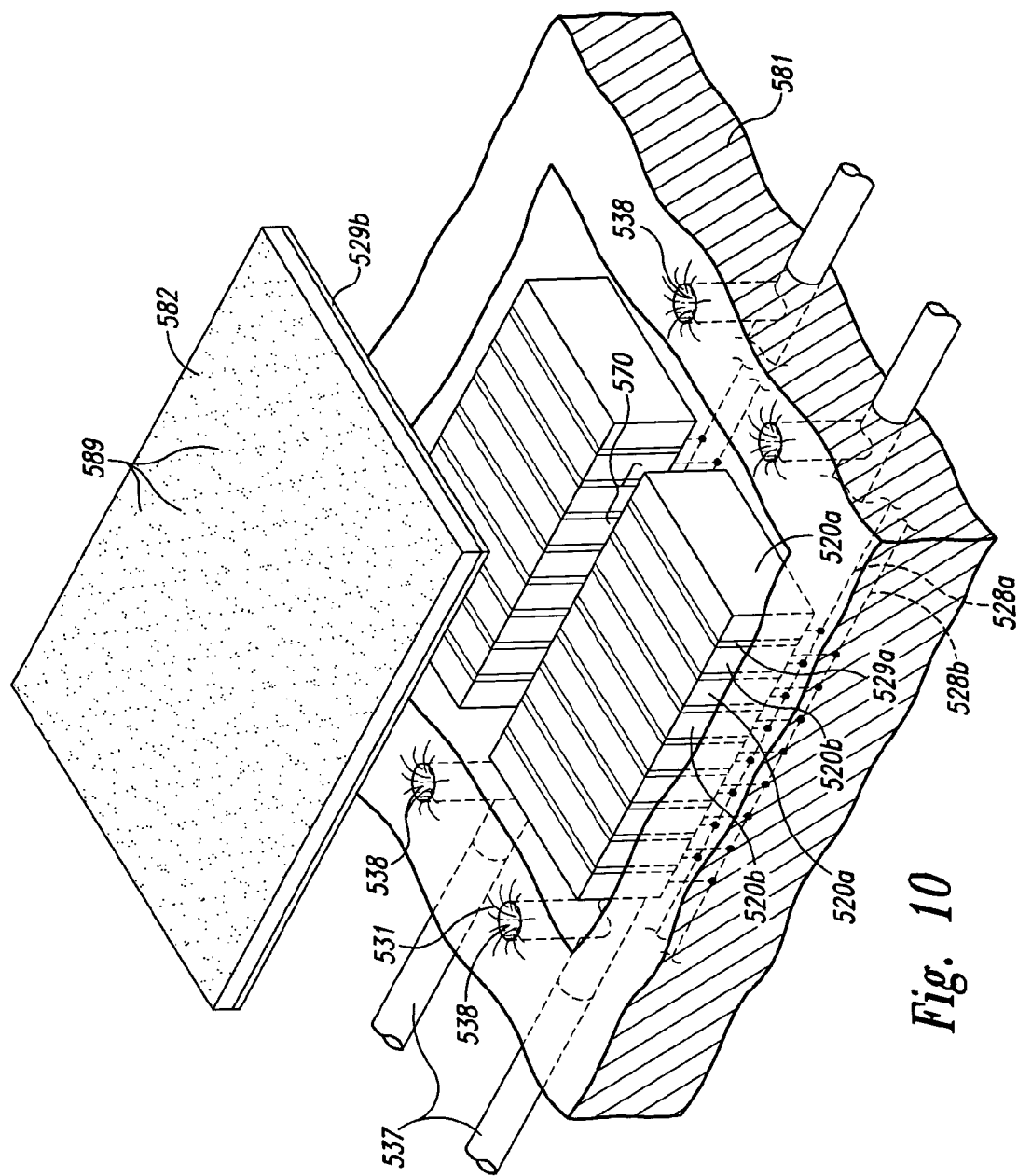
FIG. 10 is a partially schematic, partially exploded isometric view of a planarizing pad and a plurality of electrodes in accordance with still another embodiment of the invention.

FIG. 10 is a partially exploded, partially schematic isometric view of a portion of the apparatus 560 described above with reference to FIG. 9. In one aspect of an embodiment shown in FIG. 10, the top-panel 581 houses a plurality of electrode pairs 570, each of which includes a first electrode 520a and a second electrode 520b. The first electrodes 520a are coupled to a first lead 528a and the second electrodes 520b are coupled to a second lead 528b. The first and second leads 528a and 528b are coupled to the current source 521 (FIG. 9). In one aspect of this embodiment, the first electrode 520a can be separated from the second electrodes 520b by an electrode dielectric layer 529a that includes Teflon™ or another suitable dielectric material. The electrode dielectric layer 529a can accordingly control the volume and dielectric constant of the region between the first and second electrodes 520a and 520b to control electrical coupling between the electrodes.

The electrodes 520a and 520b can be electrically coupled to the microelectronic substrate 110 (FIG. 9) by the planarizing pad 582. In one aspect of this embodiment, the planarizing pad 582 is saturated with an electrolyte 531 supplied by the supply conduits 537 through apertures 538 in the top-panel 581 just beneath the planarizing pad 582. Accordingly, the electrodes 520a and 520b are selected to be compatible with the electrolyte 531. In an alternate arrangement, the electrolyte 531 can be supplied to the planarizing pad 582 from above (for example, by disposing the electrolyte 531 in the planarizing liquid 587) rather than through the top-panel 581. Accordingly, the planarizing pad 582 can include a pad dielectric layer 529b positioned between the planarizing pad 582 and the electrodes 520a and 520b. When the pad dielectric layer 529b is in place, the electrodes 520a and 520b are isolated from physical contact with the electrolyte 531 and can accordingly be selected from materials that are not necessarily compatible with the electrolyte 531.

In either of the embodiments described above with reference to FIG. 10, the planarizing pad 582 can provide several advantages over some conventional electrolytic arrangements. For example, the planarizing pad 582 can uniformly separate the electrodes 520a and 520b from the microelectronic substrate 110 (FIG. 9), which can increase the uniformity with which the electrolytic process removes material from the conductive layer 111 (FIG. 9). The planarizing pad 582 can also have abrasive particles 589 for planarizing the microelectronic substrate 110 in the manner described above with reference to FIG. 9. Furthermore, the planarizing pad 582 can filter carbon or other material that erodes from the electrodes 520a and 520b to prevent the electrode material from contacting the microelectronic substrate 110. Still further, the planarizing pad 582 can act as a sponge to retain the electrolyte 531 in close proximity to the microelectronic substrate 110.

Figure 11:
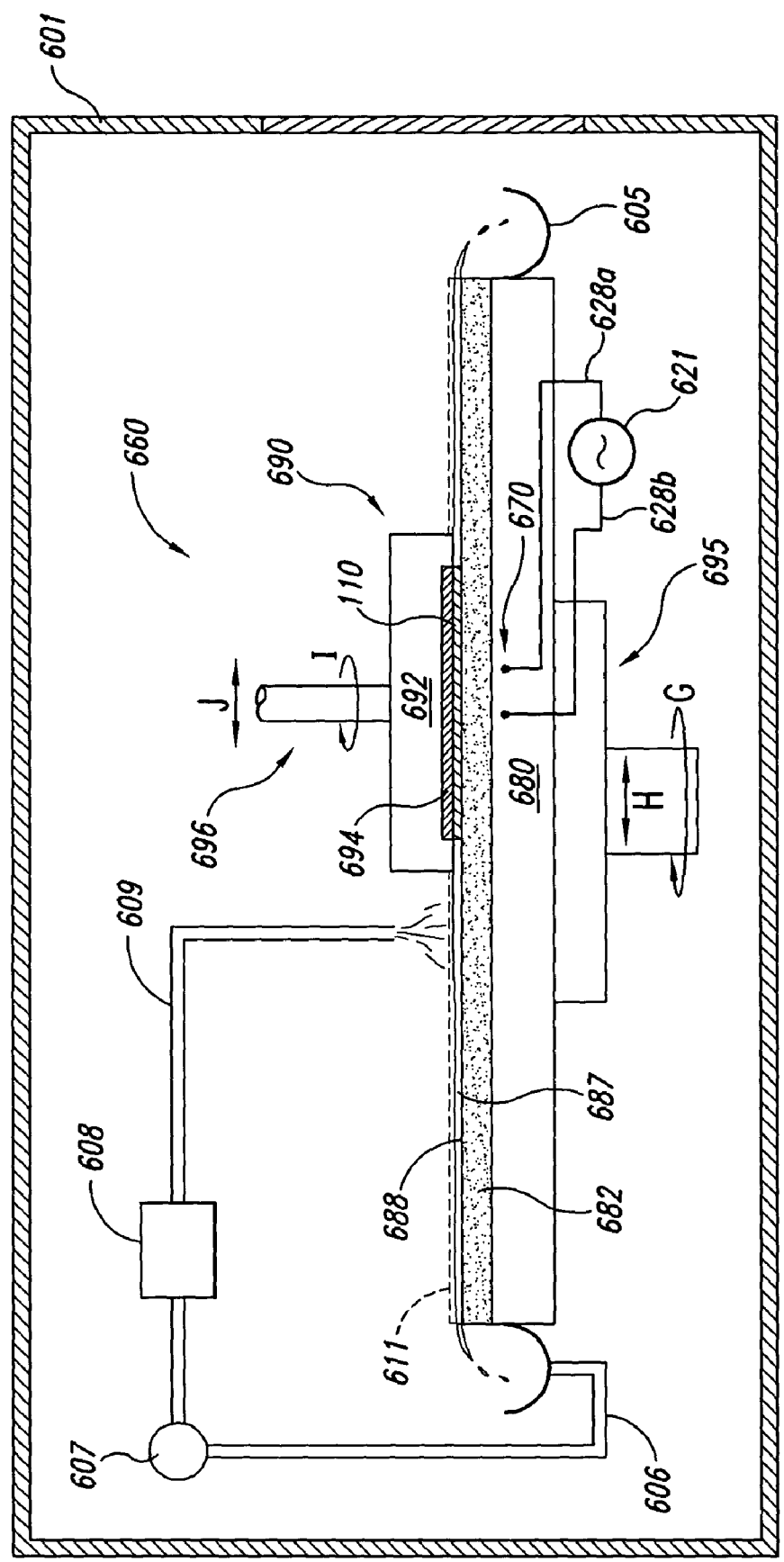
FIG. 11 is a partially schematic, side elevational view of an apparatus for both planarizing and electrolytically processing microelectronic substrates in accordance with still another embodiment of the invention.

FIG. 11 is a partially schematic, cross-sectional side elevational view of a rotary apparatus 660 for planarizing and/or electrolytically processing the microelectronic substrate 110 in accordance with another embodiment of the invention. In one aspect of this embodiment, the apparatus 660 has a generally circular platen or table 680, a carrier assembly 690, a planarizing or polishing pad 682 positioned on the table 680, and an electrolytic liquid 687 on the planarizing pad 682. The planarizing pad 682 can be a fixed abrasive planarizing pad or, alternatively, the electrolytic liquid 687 can include a slurry having a suspension of abrasive elements and the planarizing pad 682 can be a non-abrasive pad. A drive assembly 695 rotates (arrow "G") and/or reciprocates (arrow "H") the platen 680 to move the planarizing pad 682 during planarization.

The carrier assembly 690 controls and protects the microelectronic substrate 110 during planarization. The carrier assembly 690 typically has a substrate holder 692 with a pad 694 that holds the microelectronic substrate 110 via suction. A drive assembly 696 of the carrier assembly 690 typically rotates and/or translates the substrate holder 692 (arrows "I" and "J," respectively). Alternatively, the substrate holder 692 may include a weighted, free-floating disk (not shown) that slides over the planarizing pad 682.

To planarize the microelectronic substrate 110 with the apparatus 660, the carrier assembly 690 presses the microelectronic substrate 110 against a planarizing surface 688 of the planarizing pad 682. The platen 680 and/or the substrate holder 692 then move relative to one another to translate the microelectronic substrate 110 across the planarizing surface 688. As a result, the abrasive particles in the planarizing pad 682 and/or the chemicals in the electrolytic liquid 687 remove material from the surface of the microelectronic substrate 110.

The apparatus 660 can also include a current source 621 coupled with leads 628a and 628b to one or more electrode pairs 670 (one of which is shown in FIG. 11). The electrode pairs 670 can be integrated with the platen 680 in generally the same manner with which the electrodes 520a and 520b (FIG. 10) are integrated with the top panel 581 (FIG. 10). Alternatively, the electrode pairs 670 can be integrated with the planarizing pad 682. In either embodiment, the electrode pairs 670 can include electrodes having shapes and configurations generally similar to any of those described above with reference to FIGS. 3–10 to electrolytically remove conductive material from the microelectronic substrate 110. The electrolytic process can be carried out before, during or after the CMP process, as described above with reference to FIG. 9.

In one aspect of an embodiment of the apparatus 660 described above with reference to FIG. 11, an enclosure 601 can be disposed around the planarizing pad 682 and the electrolytic liquid 687 to control the amount of water (if any) that mixes with the electrolytic liquid 687. In another aspect of this embodiment, the apparatus 660 can include a fluid collector 605 positioned to collect the electrolytic liquid 687 as it flows off the planarizing pad 682. The electrolytic liquid 687 can pass through a return conduit 606 to a pump 607 which returns the electrolytic liquid 687 to the planarizing pad 682 via a supply conduit 609. A separator 608 can be positioned at a selected point along the return conduit 606 and/or the supply conduit 609 to remove some or all of any water that may become a constituent of the electrolytic liquid 687. The separator 608 can be used in addition to or in lieu of the desiccant and/or purge gas described above with reference to FIG. 9.

In one aspect of an embodiment of the apparatus 660 shown in FIG. 11, all the liquid disposed on the planarizing pad 682 can be provided by a single supply conduit. Accordingly, the liquid provided by the supply conduit 609 can have both electrolytic characteristics and planarizing/polishing characteristics. For example, in one aspect of this embodiment, the liquid can include a suspension of abrasive elements. In other embodiments, liquids having electrolytic characteristics can be mixed at the planarizing pad 687 with liquids having polishing characteristics, for example, in a manner generally similarly to that described above with reference to FIG. 9. In either embodiment, the region adjacent to the planarizing pad 687, including the region between the planarizing pad 687 and the microelectronic substrate 110, can define an electrolytic liquid volume 611, which receives electrolytic liquid and in which the microelectronic substrate 110 is electrolytically processed.

Figure 12A:
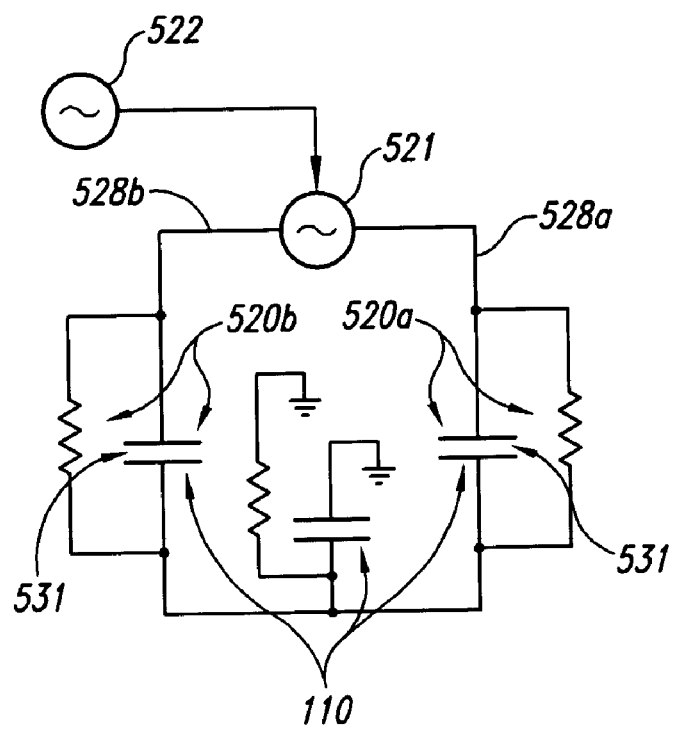
FIGS. 12A–B schematically illustrate a circuit and wave form for electrolytically processing a microelectronic substrate in accordance with yet another embodiment of the invention.

FIG. 12A is a schematic circuit representation of some of the components described above with reference to FIG. 10. The circuit analogy can also apply to any of the arrangements described above with reference to FIGS. 3–11. As shown schematically in FIG. 12A, the current source 521 is coupled to the first electrode 520a and the second electrode 520b with leads 528a and 528b respectively. The electrodes 520a and 520b are coupled to the microelectronic substrate 110 with the electrolyte 531 in an arrangement that can be represented schematically by two sets of parallel capacitors and resistors. A third capacitor and resistor schematically indicates that the microelectronic substrate 110 "floats" relative to ground or another potential.

Figure 12B:
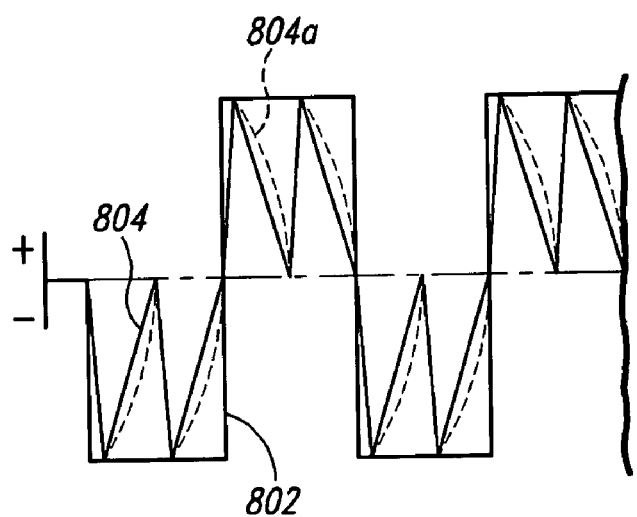

In one aspect of an embodiment shown in FIG. 12A, the current source 521 can be coupled to an amplitude modulator 522 that modulates the signal produced by the current source 521, as is shown in FIG. 12B. Accordingly, the current source 521 can generate a high-frequency wave 804, and the amplitude modulator 522 can superimpose a low-frequency wave 802 on the high-frequency wave 804. For example, the high-frequency wave 804 can include a series of positive or negative voltage spikes contained within a square wave envelope defined by the low-frequency wave 802. Each spike of the high-frequency wave 804 can have a relatively steep rise time slope to transfer charge through the dielectric to the electrolyte, and a more gradual fall time slope. The fall time slope can define a straight line, as indicated by high-frequency wave 804, or a curved line, as indicated by high-frequency wave 804a. In other embodiments, the high-frequency wave 804 and the low-frequency wave 802 can have other shapes depending, for example, on the particular characteristics of the dielectric material and electrolyte adjacent to the electrodes 420, the characteristics of the substrate 110, and/or the target rate at which material is to be removed from the substrate 110.

An advantage of this arrangement is that the high frequency signal can transmit the required electrical energy from the electrodes 520a and 520b to the microelectronic substrate 110, while the low frequency superimposed signal can more effectively promote the electrochemical reaction between the electrolyte 531 and the conductive layer 111 of the microelectronic substrate 110. Accordingly, any of the embodiments described above with reference to FIGS. 3–11 can include an amplitude modulator in addition to a current source.

From the foregoing, it will be appreciated that, although specific embodiments of the invention have been described herein for purposes of illustration, various modifications may be made without deviating from the spirit and scope of the invention. Accordingly, the invention is not limited except as by the appended claims.

We claim:

1. A method for removing material from a microelectronic substrate, comprising:
   disposing an electrolytic liquid between an electrically conductive material of a microelectronic substrate and at least one electrode, the electrolytic liquid having about 80% water or less;
   contacting the microelectronic substrate with a polishing pad material;
   electrically coupling the conductive material of the microelectronic substrate to a source of varying electrical signals via the electrolytic liquid and the at least one electrode;
   applying a varying electrical signal to the conductive material;
   forming an oxy-methoxide complex with the electrically conductive material;
   moving at least one of the polishing pad material and the microelectronic substrate relative to the other; and
   removing at least a portion of the conductive material from the microelectronic substrate while the electrolytic liquid is adjacent to the electrically conductive material.

2. A method for removing material from a microelectronic substrate, comprising:
   disposing an electrolytic liquid between an electrically conductive material of a microelectronic substrate and at least one electrode, the electrolytic liquid having about 80% water or less and having methanol as a constituent;
   contacting the microelectronic substrate with a polishing pad material;
   electrically coupling the conductive material of the microelectronic substrate to a source of varying electrical signals via the electrolytic liquid and the at least one electrode;
   applying a varying electrical signal to the conductive material;
   moving at least one of the polishing pad material and the microelectronic substrate relative to the other; and
   removing at least a portion of the conductive material from the microelectronic substrate while the electrolytic liquid is adjacent to the electrically conductive material.

3. A method for removing material from a microelectronic substrate, comprising:
- disposing an electrolytic liquid between an electrically conductive material of a microelectronic substrate and at least one electrode, the electrolytic liquid having about 80% water or less and having ammonium chloride as a constituent;
- contacting the microelectronic substrate with a polishing pad material;
- electrically coupling the conductive material of the microelectronic substrate to a source of varying electrical signals via the electrolytic liquid and the at least one electrode;
- applying a varying electrical signal to the conductive material;
- moving at least one of the polishing pad material and the microelectronic substrate relative to the other; and
- removing at least a portion of the conductive material from the microelectronic substrate while the electrolytic liquid is adjacent to the electrically conductive material.

4. A method for removing material from a microelectronic substrate, comprising:
- disposing an electrolytic liquid between an electrically conductive material of a microelectronic substrate and at least one electrode, the electrolytic liquid having about 80% water or less and having a nitrile as a constituent;
- contacting the microelectronic substrate with a polishing pad material;
- electrically coupling the conductive material of the microelectronic substrate to a source of varying electrical signals via the electrolytic liquid and the at least one electrode;
- applying a varying electrical signal to the conductive material;
- moving at least one of the polishing pad material and the microelectronic substrate relative to the other; and
- removing at least a portion of the conductive material from the microelectronic substrate while the electrolytic liquid is adjacent to the electrically conductive material.

5. A method for removing material from a microelectronic substrate, comprising:
- disposing an electrolytic liquid between an electrically conductive material of a microelectronic substrate and at least one electrode, the electrolytic liquid having about 80% water or less and having an isonitrile as a constituent;
- contacting the microelectronic substrate with a polishing pad material;
- electrically coupling the conductive material of the microelectronic substrate to a source of varying electrical signals via the electrolytic liquid and the at least one electrode;
- applying a varying electrical signal to the conductive material;
- moving at least one of the polishing pad material and the microelectronic substrate relative to the other; and
- removing at least a portion of the conductive material from the microelectronic substrate while the electrolytic liquid is adjacent to the electrically conductive material.

6. A method for removing material from a microelectronic substrate, comprising:
- disposing an electrolytic liquid between an electrically conductive material of a microelectronic substrate and at least one electrode, the electrolytic liquid having about 80% water or less and having an aromatic hydrocarbon as a constituent;
- contacting the microelectronic substrate with a polishing pad material;
- electrically coupling the conductive material of the microelectronic substrate to a source of varying electrical signals via the electrolytic liquid and the at least one electrode;
- applying a varying electrical signal to the conductive material;
- moving at least one of the polishing pad material and the microelectronic substrate relative to the other; and
- removing at least a portion of the conductive material from the microelectronic substrate while the electrolytic liquid is adjacent to the electrically conductive material.

7. A method for removing material from a microelectronic substrate, comprising:
- disposing an electrolytic liquid between an electrically conductive material of a microelectronic substrate and at least one electrode, the electrolytic liquid having about 80% water or less and having a halocarbon as a constituent;
- contacting the microelectronic substrate with a polishing pad material;
- electrically coupling the conductive material of the microelectronic substrate to a source of varying electrical signals via the electrolytic liquid and the at least one electrode;
- applying a varying electrical signal to the conductive material;
- moving at least one of the polishing pad material and the microelectronic substrate relative to the other; and
- removing at least a portion of the conductive material from the microelectronic substrate while the electrolytic liquid is adjacent to the electrically conductive material.

8. A method for removing material from a microelectronic substrate, comprising:
- disposing an electrolytic liquid between an electrically conductive material of a microelectronic substrate and at least one electrode, the electrolytic liquid having about 80% water or less and having an alkoxide as a constituent;
- contacting the microelectronic substrate with a polishing pad material;
- electrically coupling the conductive material of the microelectronic substrate to a source of varying electrical signals via the electrolytic liquid and the at least one electrode;
- applying a varying electrical signal to the conductive material;
- moving at least one of the polishing pad material and the microelectronic substrate relative to the other; and
- removing at least a portion of the conductive material from the microelectronic substrate while the electrolytic liquid is adjacent to the electrically conductive material.

9. A method for removing material from a microelectronic substrate, comprising:
- disposing an electrolytic liquid between an electrically conductive material of a microelectronic substrate and at least one electrode, the electrolytic liquid having about 80% water or less;
- contacting the microelectronic substrate with a polishing pad material;

electrically coupling the conductive material of the microelectronic substrate to a source of varying electrical signals via the electrolytic liquid and the at least one electrode;

applying a varying electrical signal to the conductive material;

moving at least one of the polishing pad material and the microelectronic substrate relative to the other;

removing at least a portion of the conductive material from the microelectronic substrate while the electrolytic liquid is adjacent to the electrically conductive material;

and least restricting exposure of the electrolytic liquid to water.

10. The method of claim 9, further comprising oxidizing at least a portion of the conductive material by applying the varying electrical signal to the conductive material.

11. The method of claim 9 wherein the conductive material includes tantalum and wherein the method further comprises complexing the tantalum as a metal-organic species in solution.

12. The method of claim 9 wherein disposing an electrolytic liquid includes disposing an electrolytic liquid having about 50% water or less.

13. The method of claim 9 wherein disposing an electrolytic liquid includes disposing an electrolytic liquid having about 10% water or less.

14. The method of claim 9 wherein disposing an electrolytic liquid includes disposing an electrolytic liquid having about 1% water or less.

15. The method of claim 9 wherein disposing an electrolytic liquid includes disposing the electrolytic liquid adjacent to a conductive material that includes tantalum.

16. The method of claim 9 wherein disposing an electrolytic liquid includes disposing the electrolytic liquid adjacent to a conductive material that includes at least one of tantalum and tantalum nitride.

17. The method of claim 9 wherein disposing an electrolytic liquid includes disposing an electrolytic liquid having an organic solvent and a salt as constituents.

18. The method of claim 9 wherein disposing an electrolytic liquid includes disposing an electrolytic liquid having a non-aqueous polar solvent as a constituent.

19. The method of claim 9 wherein disposing an electrolytic liquid includes disposing an electrolytic liquid having an organic amine as a constituent.

20. The method of claim 9 wherein disposing an electrolytic liquid includes disposing an electrolytic liquid having an organic acid as a constituent.

21. The method of claim 9 wherein disposing an electrolytic liquid includes disposing an electrolytic liquid having an organic phosphate as a constituent.

22. The method of claim 9 wherein the at least one electrode is a first electrode and wherein the method further comprises:

positioning the first electrode and a second electrode proximate to and spaced apart from the microelectronic substrate;

disposing the electrolytic liquid in fluid communication with the microelectronic substrate, the first electrode and the second electrode; and passing the electrical signal from the first electrode through the electrolytic liquid to the microelectronic substrate and from the microelectronic substrate through the electrolytic liquid to the second electrode.

23. The method of claim 9, further comprising:

moving at least one of the microelectronic substrate and the polishing pad material relative to the other; and controlling a normal force between the microelectronic substrate and the polishing pad material to be about 1.0 psi or less.

24. The method of claim 9 wherein the at least one electrode is a first electrode and wherein the method further comprises:

positioning the first electrode and a second electrode proximate to and spaced apart from the microelectronic substrate;

disposing the electrolytic liquid in fluid communication with the microelectronic substrate, the first electrode and the second electrode; and wherein removing at least a portion of the conductive material includes removing at least a portion of the conductive material by passing the electrical signal from the first electrode through the electrolytic liquid to the microelectronic substrate and from the microelectronic substrate through the electrolytic liquid to the second electrode.

25. A method for removing material from a microelectronic substrate, comprising disposing a microelectronic substrate and an electrolytic liquid in an enclosure, the enclosure at least restricting exposure of the microelectronic substrate and the electrolytic liquid to water;

disposing the an electrolytic liquid between an electrically conductive material of the microelectronic substrate and at least one electrode, the electrolytic liquid having about 80% water or less;

contacting the microelectronic substrate with a polishing pad material;

electrically coupling the conductive material of the microelectronic substrate to a source of varying electrical signals via the electrolytic liquid and the at least one electrode;

applying a varying electrical signal to the conductive material;

moving at least one of the polishing pad material and the microelectronic substrate relative to the other; and removing at least a portion of the conductive material from the microelectronic substrate while the electrolytic liquid is adjacent to the electrically conductive material.

26. A method for removing material from a microelectronic substrate, comprising:

disposing an electrolytic liquid between an electrically conductive material of a microelectronic substrate and at least one electrode, the electrically conductive material including at least one of tantalum and a tantalum compound, the electrolytic liquid having about 80% water or less and including a non-aqueous polar solvent that in turn includes methanol;

electrically coupling the conductive material of the microelectronic substrate to a source of varying electrical signals via the electrolytic liquid and the at least one electrode;

applying a varying electrical signal to the conductive material;

moving at least one of the polishing pad material and the microelectronic substrate relative to the other; and removing at least a portion of the conductive material from the microelectronic substrate while the electrolytic liquid is adjacent to the electrically conductive material.

27. The method of claim 26, further comprising:
contacting the microelectronic substrate with a polishing pad material; and
moving at least one of the microelectronic substrate and the polishing pad material relative to the other.

28. The method of claim 26, further comprising complexing the tantalum as a metal-organic species in solution.

29. The method of claim 26 wherein disposing an electrolytic liquid includes disposing an electrolytic liquid having about 50% water or less.

30. The method of claim 26 wherein disposing an electrolytic liquid includes disposing an electrolytic liquid having about 10% water or less.

31. The method of claim 26 wherein disposing an electrolytic liquid includes disposing an electrolytic liquid having about 1% water or less.

32. The method of claim 26 wherein disposing an electrolytic liquid includes disposing an electrolytic liquid having an organic solvent and a salt as constituents.

33. The method of claim 26 wherein the at least one electrode is a first electrode and wherein the method further comprises:
positioning the first electrode and a second electrode proximate to and spaced apart from the microelectronic substrate;
disposing the electrolytic liquid in fluid communication with the microelectronic substrate, the first electrode and the second electrode; and
passing the electrical signal from the first electrode through the electrolytic liquid to the microelectronic substrate and from the microelectronic substrate through the electrolytic liquid to the second electrode.

34. The method of claim 26, further comprising:
moving at least one of the microelectronic substrate and the polishing pad material relative to the other; and
controlling a normal force between the microelectronic substrate and the polishing pad material to be about 1.0 psi or less.

35. A method for removing material from a microelectronic substrate, comprising:
disposing an electrolytic liquid between an electrically conductive material of a microelectronic substrate and at least one electrode, the electrically conductive material including at least one of tantalum and a tantalum compound, the electrolytic liquid having about 80% water or less and including a non-aqueous polar solvent and ammonium chloride;
electrically coupling the conductive material of the microelectronic substrate to a source of varying electrical signals via the electrolytic liquid and the at least one electrode;
applying a varying electrical signal to the conductive material;
moving at least one of the polishing pad material and the microelectronic substrate relative to the other; and
removing at least a portion of the conductive material from the microelectronic substrate while the electrolytic liquid is adjacent to the electrically conductive material.

36. A method for removing material from a microelectronic substrate, comprising:
disposing an electrolytic liquid between an electrically conductive material of a microelectronic substrate and at least one electrode, the electrically conductive material including at least one of tantalum and a tantalum compound, the electrolytic liquid having about 80% water or less and including a non-aqueous polar solvent;
electrically coupling the conductive material of the microelectronic substrate to a source of varying electrical signals via the electrolytic liquid and the at least one electrode;
applying a varying electrical signal to the conductive material;
moving at least one of the polishing pad material and the microelectronic substrate relative to the other;
removing at least a portion of the conductive material from the microelectronic substrate while the electrolytic liquid is adjacent to the electrically conductive material; and
at least restricting exposure of the electrolytic liquid to water.

37. A method for removing material from a microelectronic substrate, comprising
disposing a microelectronic substrate and an electrolytic liquid in an enclosure, the enclosure at least restricting exposure of the microelectronic substrate and the electrolytic liquid to water;
disposing an electrolytic liquid between an electrically conductive material of a microelectronic substrate and at least one electrode, the electrically conductive material including at least one of tantalum and a tantalum compound, the electrolytic liquid having about 80% water or less and including a non-aqueous polar solvent;
electrically coupling the conductive material of the microelectronic substrate to a source of varying electrical signals via the electrolytic liquid and the at least one electrode;
applying a varying electrical signal to the conductive material;
moving at least one of the polishing pad material and the microelectronic substrate relative to the other;
removing at least a portion of the conductive material from the microelectronic substrate while the electrolytic liquid is adjacent to the electrically conductive material.

38. A method for removing material from a microelectronic substrate, comprising:
disposing an electrolytic liquid between an electrically conductive material of a microelectronic substrate and at least one electrode;
electrically coupling the conductive material of the microelectronic substrate to a source of varying electrical signals via the electrolytic liquid and the at least one electrode;
applying a varying electrical signal to the conductive material;
at least restricting exposure of the electrolytic liquid to water; and
removing at least a portion of the conductive material from the microelectronic substrate.

39. The method of claim 38 wherein at least restricting exposure of the electrolytic liquid to water includes disposing the microelectronic substrate and the electrolytic liquid in an enclosure, the enclosure being at least partially water tight.

40. The method of claim 38 wherein disposing an electrolytic liquid includes disposing an electrolytic liquid having less than about 80% water.

41. The method of claim 38 wherein at least restricting exposure of the electrolytic liquid to water includes disposing a desiccant at least proximate to the electrolytic liquid.

42. The method of claim 38 wherein at least restricting exposure of the electrolytic liquid to water includes disposing a desiccant in the electrolytic liquid.

43. The method of claim 38, further comprising:
contacting the microelectronic substrate with a polishing pad material; and
moving at least one of the microelectronic substrate and the polishing pad material relative to the other.

44. The method of claim 38 wherein the conductive material includes at least one of tantalum and a tantalum compound, and wherein the method further comprises:
contacting the microelectronic substrate with a polishing pad material;
moving at least one of the microelectronic substrate and the polishing pad material relative to the other;
complexing the conductive material as a metal-organic species in solution; and
controlling a normal force between the microelectronic substrate and the polishing pad material to be about 1.0 psi or less.

45. A method for removing material from a microelectronic substrate, comprising:
contacting a microelectronic substrate with a polishing pad material, the microelectronic substrate having a conductive material;
disposing an electrolytic liquid at an interface between the polishing pad material and the microelectronic substrate;
applying a varying electrical current to the conductive material;
moving at least one of the microelectronic substrate and the polishing pad material relative to the other;
reducing a stability of an oxide of the conductive material by at least restricting exposure of the electrolytic liquid to water;
removing at least a portion of the conductive material from the microelectronic substrate.

46. The method of claim 45 wherein the conductive material includes at least one of tantalum and a tantalum compound, and wherein reducing a stability of an oxide of the conductive material includes reducing a stability of tantalum pentoxide.

47. The method of claim 45 wherein at least restricting exposure of the planarizing liquid to water includes disposing the electrolytic liquid and the microelectronic substrate in an enclosure with the enclosure being at least partially water tight.

48. A method for removing material from a microelectronic substrate, comprising:
contacting a microelectronic substrate with a polishing pad material, the microelectronic substrate having a conductive material;
disposing an electrolytic liquid at an interface between the polishing pad material and the microelectronic substrate;
applying a varying electrical current to the conductive material via the electrolytic liquid;
moving at least one of the microelectronic substrate and the polishing pad material relative to the other;
controlling a normal force between the polishing pad material and the microelectronic substrate by at least restricting exposure of the electrolytic liquid to water; and
removing at least a portion of the conductive material from the microelectronic substrate.

49. The method of claim 48 wherein controlling a normal force includes reducing the normal force compared with a normal force required if the exposure of the electrolytic liquid to water were not restricted.

50. The method of claim 48 wherein controlling a normal force includes controlling the normal force to be about 1.0 psi or less.

51. A method for removing material from a microelectronic substrate, comprising:
contacting a microelectronic substrate with a polishing pad material, the microelectronic substrate having at least one of tantalum and tantalum nitride;
disposing an electrolytic liquid at an interface between the polishing pad material and the microelectronic substrate, the electrolytic liquid having 1% water or less;
at least restricting exposure of the microelectronic substrate, the polishing pad material and the planarizing liquid to water with an enclosure disposed around the microelectronic substrate, the polishing pad and the electrolytic liquid;
positioning first and second electrodes to be spaced apart from the microelectronic substrate and in fluid communication with the microelectronic substrate via the electrolytic liquid;
applying a varying electrical current to at least one of the first and second electrodes;
moving at least one of the microelectronic substrate and the polishing pad material relative to the other;
applying a normal force between the polishing pad material and the microelectronic substrate of about 1.0 psi or less; and
removing at least a portion of the conductive material from the microelectronic substrate.

52. The method of claim 51, further comprising forming a tantalum complex.

53. The method of claim 51, further comprising complexing the tantalum as a metal-organic species in solution.

54. The method of claim 51 wherein applying a normal force includes applying a normal force to a microelectronic substrate positioned on top of the polishing pad material.

55. The method of claim 51 wherein moving at least one of the microelectronic substrate and the polishing pad material relative to the other includes moving the microelectronic substrate relative to the polishing pad material.

56. The method of claim 51 wherein disposing a planarizing liquid includes disposing a planarizing liquid containing an electrolyte.

* * * * *

UNITED STATES PATENT AND TRADEMARK OFFICE
CERTIFICATE OF CORRECTION

PATENT NO. : 7,112,122 B2  Page 1 of 1
APPLICATION NO. : 10/665219
DATED : September 26, 2006
INVENTOR(S) : Lee et al.

It is certified that error appears in the above-identified patent and that said Letters Patent is hereby corrected as shown below:

Title page item (56) line 49, on Page 2, References Cited, U.S. Patent Documents, the following cited reference should be listed:

6,206,756    B1    3/2001    Chopra et al.

Signed and Sealed this

Ninth Day of January, 2007

JON W. DUDAS
*Director of the United States Patent and Trademark Office*